US012563308B2

(12) United States Patent
Swami

(10) Patent No.: US 12,563,308 B2
(45) Date of Patent: Feb. 24, 2026

(54) DEMOSAICING QUAD BAYER RAW IMAGE USING CORRELATION OF COLOR CHANNELS

(71) Applicant: Apple Inc., Cupertino, CA (US)

(72) Inventor: Sarvesh Swami, San Jose, CA (US)

(73) Assignee: APPLE INC., Cupertino, CA (US)

( * ) Notice: Subject to any disclaimer, the term of this patent is extended or adjusted under 35 U.S.C. 154(b) by 328 days.

(21) Appl. No.: 18/118,335

(22) Filed: Mar. 7, 2023

(65) Prior Publication Data

US 2024/0305901 A1 Sep. 12, 2024

(51) Int. Cl.
*H04N 23/84* (2023.01)

(52) U.S. Cl.
CPC ................................. *H04N 23/843* (2023.01)

(58) Field of Classification Search
CPC ............................ H04N 23/843; G06T 3/4015
See application file for complete search history.

(56) References Cited

U.S. PATENT DOCUMENTS

| | | |
|---|---|---|
| 8,638,342 B2 | 1/2014 | Cote et al. |
| 8,873,847 B2 | 10/2014 | Alacoque |
| 10,339,631 B2 | 7/2019 | Price et al. |
| 11,089,247 B2 | 8/2021 | Cote et al. |
| 11,301,958 B2 | 4/2022 | Nomura |
| 11,481,873 B2 | 10/2022 | Zavalishin et al. |
| 12,108,168 B1 * | 10/2024 | Pawlik ..................... H04N 9/77 |

| | | | |
|---|---|---|---|
| 2008/0030603 A1 * | 2/2008 | Masuno ............... | H04N 25/131 |
| | | | 348/E9.01 |
| 2011/0141321 A1 * | 6/2011 | Tang ..................... | H04N 25/611 |
| | | | 348/240.99 |
| 2014/0118582 A1 * | 5/2014 | Artyomov .............. | H04N 23/81 |
| | | | 348/242 |
| 2016/0284053 A1 * | 9/2016 | Nishimura ............ | G06T 11/001 |
| 2019/0318451 A1 * | 10/2019 | Swami .................. | G06T 3/4015 |
| 2021/0104016 A1 * | 4/2021 | Gal ........................ | G06T 3/4015 |
| 2022/0385843 A1 | 12/2022 | Price et al. | |

FOREIGN PATENT DOCUMENTS

| | | |
|---|---|---|
| CN | 114792286 A | 7/2022 |
| KR | 10-1700928 B1 | 2/2017 |

* cited by examiner

*Primary Examiner* — Sinh Tran
*Assistant Examiner* — Zhenzhen Wu
(74) *Attorney, Agent, or Firm* — Sterne, Kessler, Goldstein & Fox, P.L.L.C.

(57) ABSTRACT

Embodiments relate to demosaicing a raw image into a full-resolution green pixels and using high-frequency components of the full-resolution green pixels to add details into red image pixels and blue image pixels. The full-resolution green pixels are generated by interpolating green pixels in the raw image using residual weights based on correlation between green pixels and non-green pixels along different directions, and then combining the green pixel values interpolated along different directions using weights derived from gradient information. The full-resolution red and blue pixels are generated by determining weights according to the correlation of interpolated red and blue pixels relative to the full-resolution green pixels, and adding the high-frequency components of the full-resolution green pixels to the interpolated red and blue pixels.

20 Claims, 16 Drawing Sheets

502

Image Sample 1302

1302a

1302b

Second-Order Same-Color Grad. (Wh) 1304

1304a

R/B Cross-color Gradient (Ch) 1306

First-Order Same-Color Grad. (Eh) 1308

Combined Gradient 1310

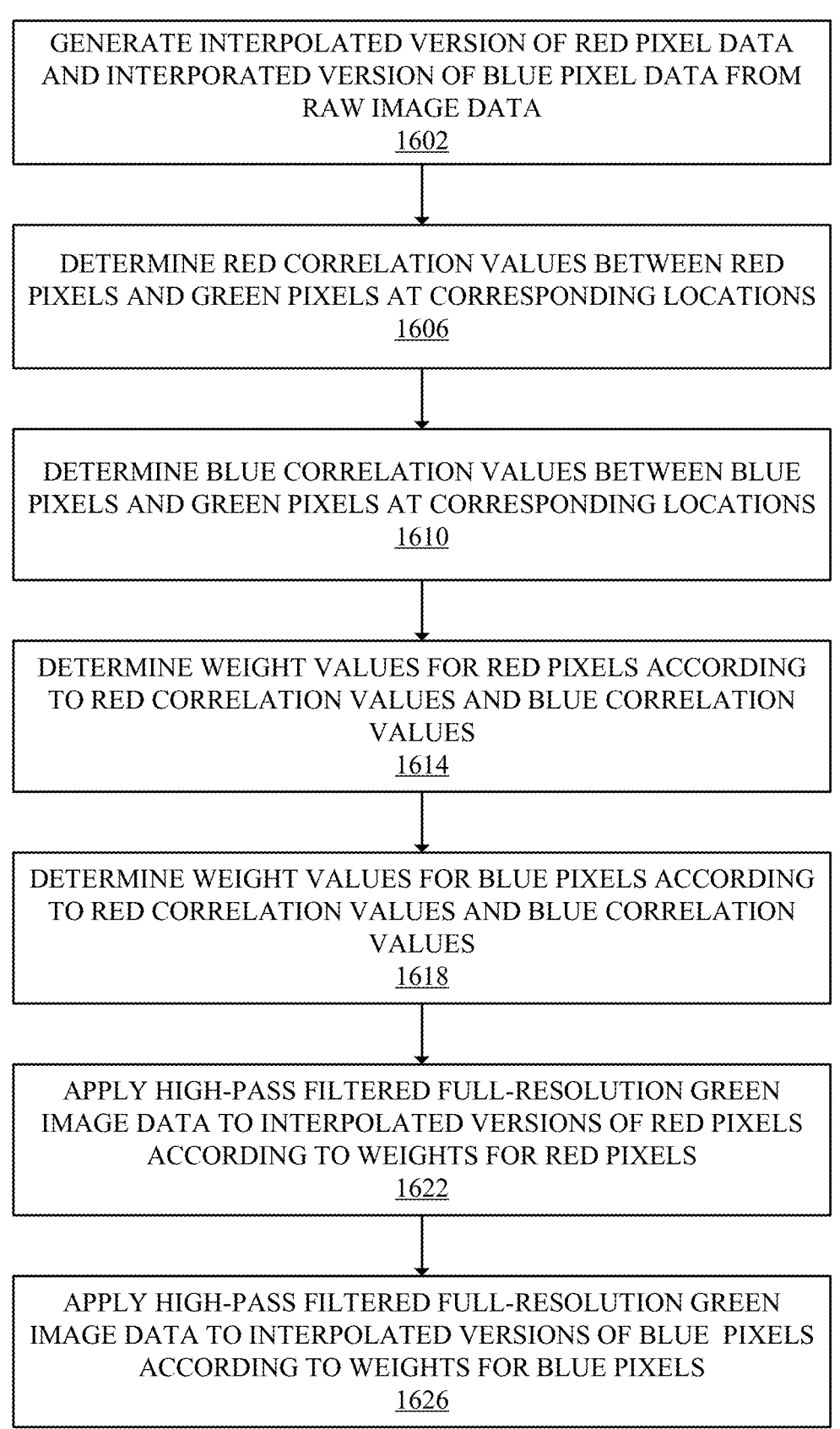

GENERATE INTERPOLATED VERSION OF RED PIXEL DATA AND INTERPORATED VERSION OF BLUE PIXEL DATA FROM RAW IMAGE DATA
1602

DETERMINE RED CORRELATION VALUES BETWEEN RED PIXELS AND GREEN PIXELS AT CORRESPONDING LOCATIONS
1606

DETERMINE BLUE CORRELATION VALUES BETWEEN BLUE PIXELS AND GREEN PIXELS AT CORRESPONDING LOCATIONS
1610

DETERMINE WEIGHT VALUES FOR RED PIXELS ACCORDING TO RED CORRELATION VALUES AND BLUE CORRELATION VALUES
1614

DETERMINE WEIGHT VALUES FOR BLUE PIXELS ACCORDING TO RED CORRELATION VALUES AND BLUE CORRELATION VALUES
1618

APPLY HIGH-PASS FILTERED FULL-RESOLUTION GREEN IMAGE DATA TO INTERPOLATED VERSIONS OF RED PIXELS ACCORDING TO WEIGHTS FOR RED PIXELS
1622

APPLY HIGH-PASS FILTERED FULL-RESOLUTION GREEN IMAGE DATA TO INTERPOLATED VERSIONS OF BLUE PIXELS ACCORDING TO WEIGHTS FOR BLUE PIXELS
1626

*FIG. 16*

DEMOSAICING QUAD BAYER RAW IMAGE USING CORRELATION OF COLOR CHANNELS

BACKGROUND

1. Field of the Disclosure

The present disclosure relates to a circuit for processing images and more specifically to demosaicing a raw image.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on a central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

Image sensors typically capture image data using a color filter array, resulting in the raw image data where each pixel is associated with a particular color channel. Image processing pipelines may include circuitry for demosaicing raw image data to generate full-color image data, where different circuits may be used for different raw image formats.

SUMMARY

Embodiments relate to demosaicing a raw image by generating full-resolution green image data and then generating full-resolution non-green image data by adding high-pass filtered version of the full-resolution green image data to interpolated non-green image data. The full-resolution green image data is generated by interpolate green pixel data in the raw image along a plurality of directions, and then combining the respective interpolated green data to generate full-resolution green image data. An interpolated version of red pixel data and an interpolated version of blue pixel data are generated from the raw image data. Red correlation values between red pixels in the interpolated version of the red pixel data and first green pixels at corresponding first locations in the full-resolution green image data are determined. Blue correlation values between blue pixels in the interpolated blue pixel data and second green pixels at corresponding second locations in the full-resolution green image data are determined. Weight values for red pixels according to the red correlation values and the blue correlation values are determined, and used as factors for applying pixel values of a high-pass filtered version of the full-resolution green image data to the interpolated version of the red pixel data to generate full-resolution red image data.

BRIEF DESCRIPTION OF THE DRAWINGS

FIG. 16 is a flowchart of a process at the guided filter, in accordance with some embodiments.

Figure 1:
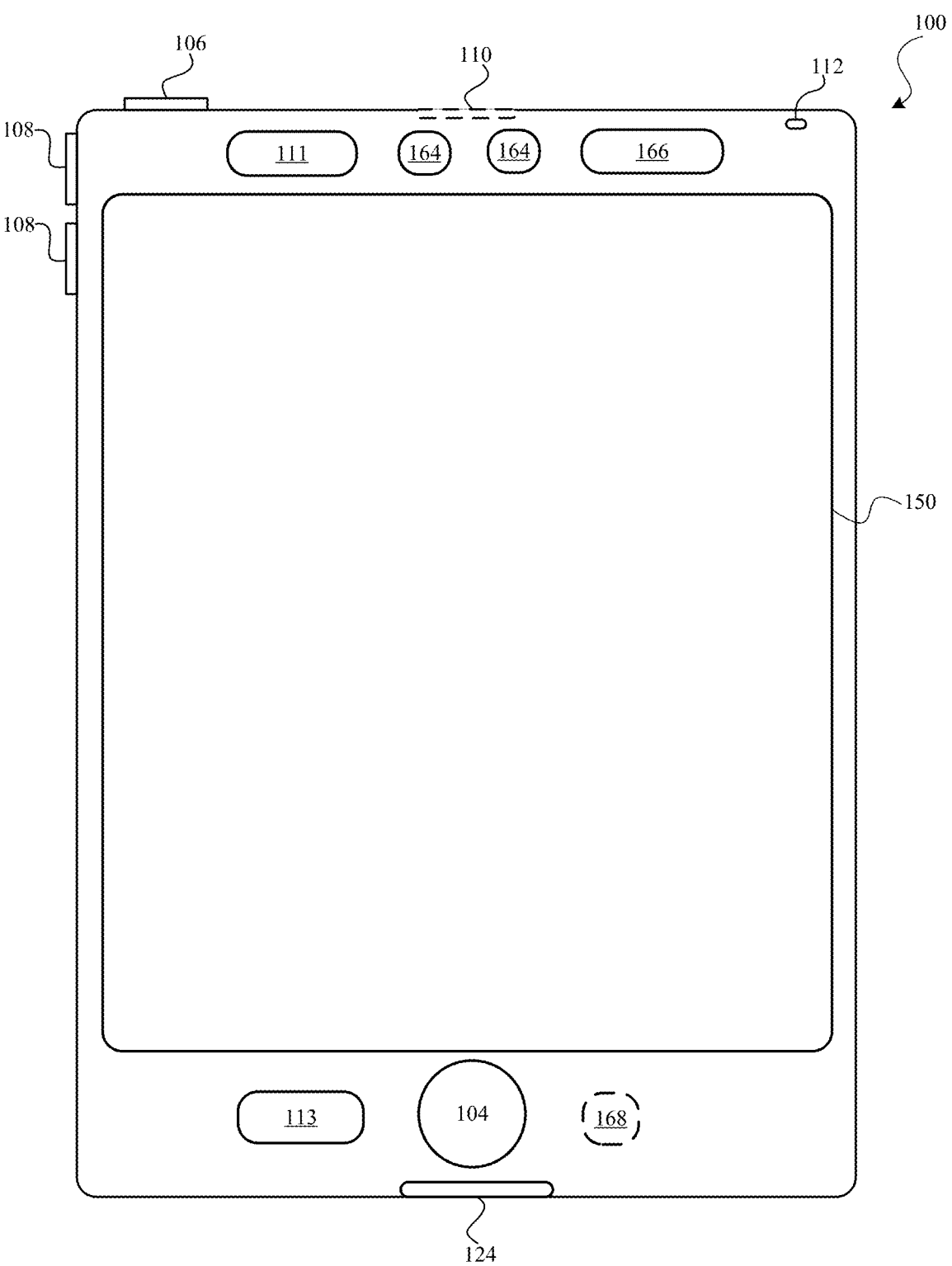
FIG. 1 is a high-level diagram of an electronic device, according to one embodiment.

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to demosaicing a raw image by generating full-resolution green pixel data and adding high-frequency components of the full-resolution green pixel data into red image pixel data and blue image pixel data. The full-resolution green pixels are generated by interpolating green pixel data in the raw image using residual weights based on correlation between green pixel data and non-green pixel data along different directions, and then combining the green pixel data interpolated along different directions using weights derived from gradient information. The full-resolution red and blue pixel data are generated by determining weights according to the correlation of interpolated red and blue pixel data relative to the full-resolution green pixel data, and adding the high-frequency components of the full-resolution green pixel data to the interpolated red and blue pixel data. In this way, high resolution details from the full-resolution green pixel data may be applied to the non-green pixels to generate a more refined and accurate non-green pixel data in a demosaiced image.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
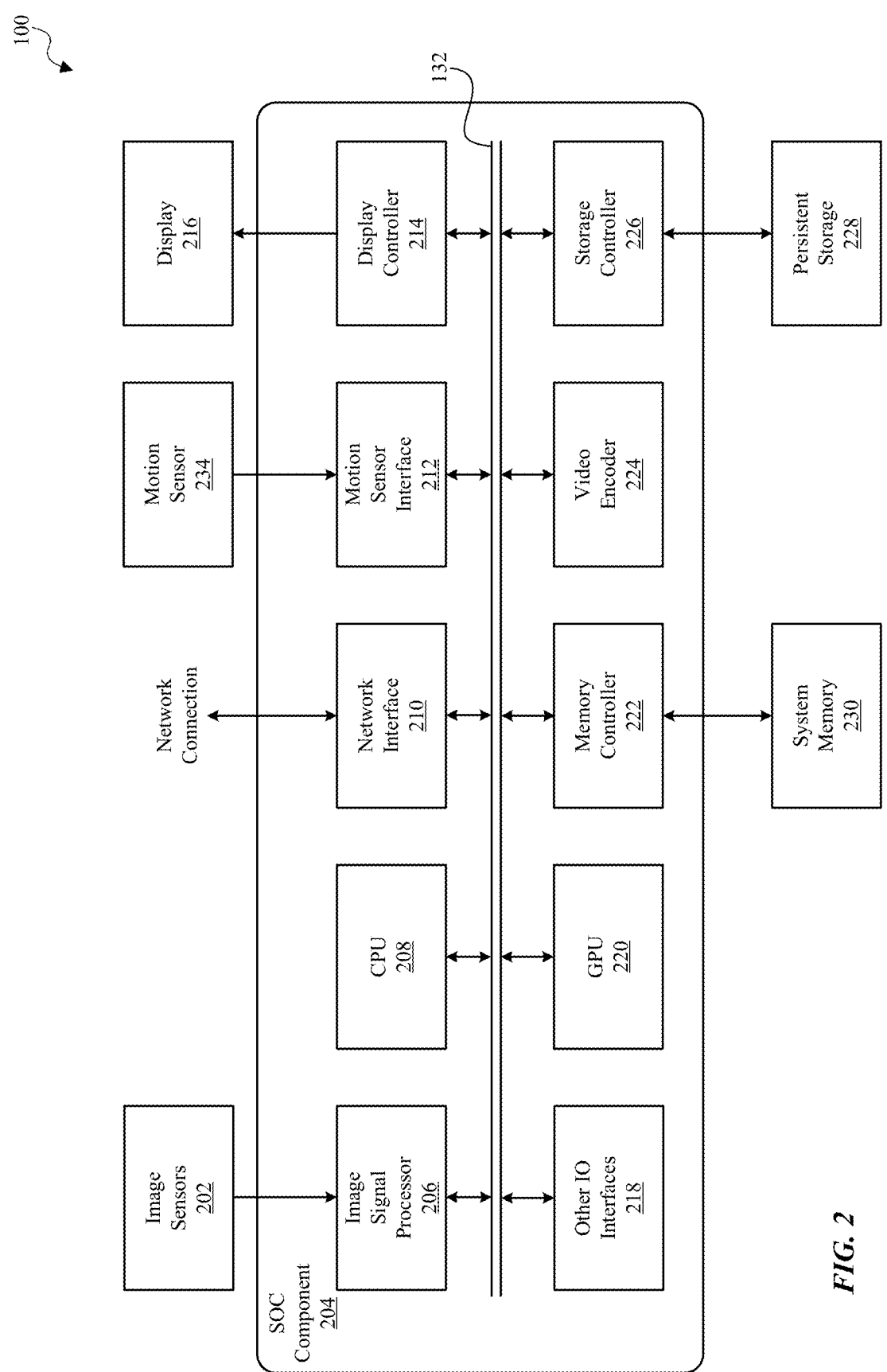
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, a liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
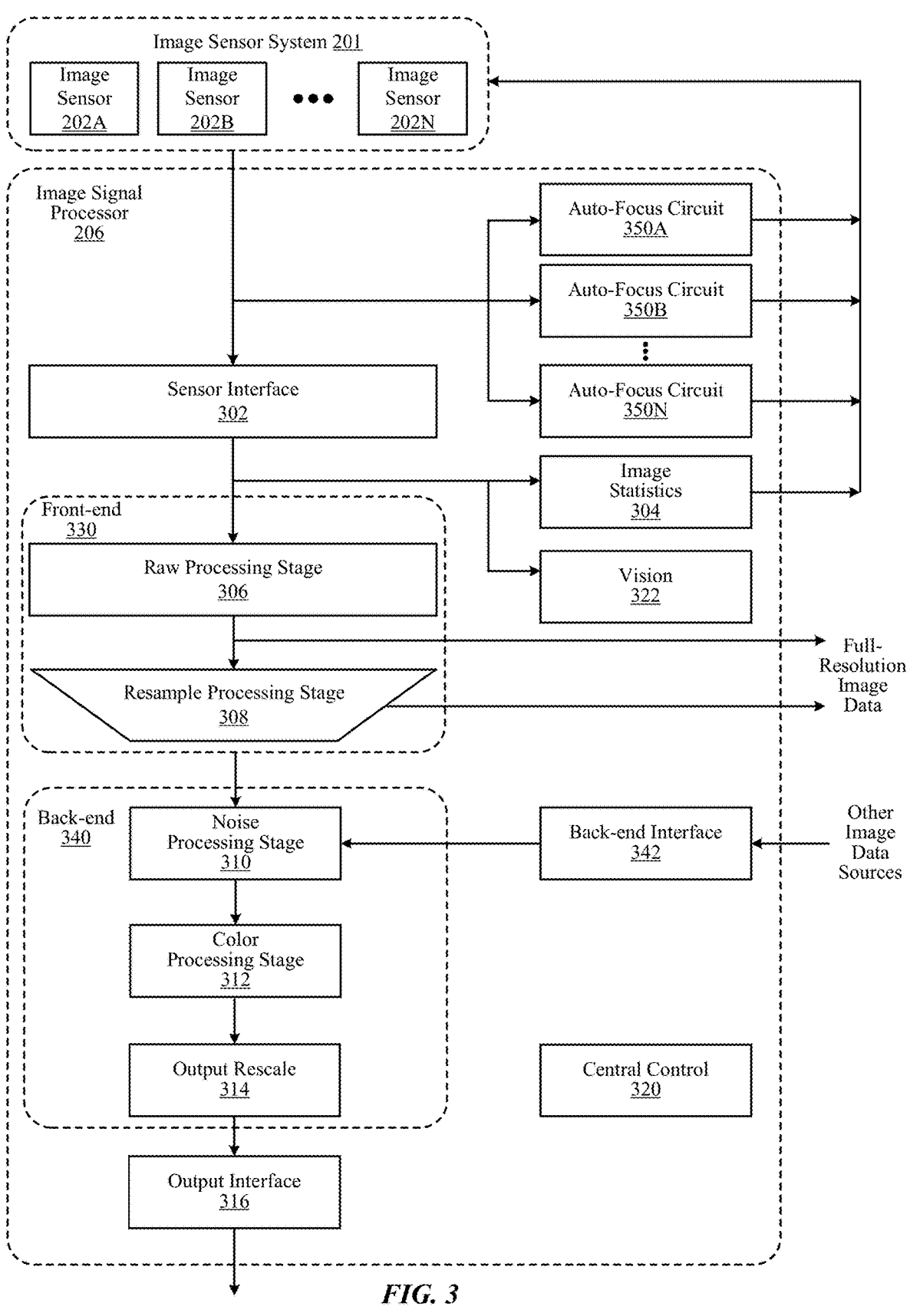
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control module 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include a hardware circuit that analyzes raw image data to determine an appropriate lens position of each image sensor 202. In one embodiment, the raw image data may include data that is transmitted from image sensing pixels that specialize in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end pipeline stages 330 and back-end pipeline stages 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamlessly transition from image data captured by one image sensor 202 to image data captured by another image sensor 202 without waiting for the second image sensor 202 to adjust its lens position because two or more auto-focus circuits 350 may continuously provide auto-focus data to the image sensor system 201.

Raw image data captured by different image sensors 202 may also be transmitted to a sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a drop-off in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistical data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCbCr format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in image analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of an image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial noise filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional input coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement a series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between input image data and output image data in order to correct artifacts and motion caused by sensor motion during the capture of the image frame. Output rescale may provide image data via the output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Multi-Mode Demosaicing

Figure 4:
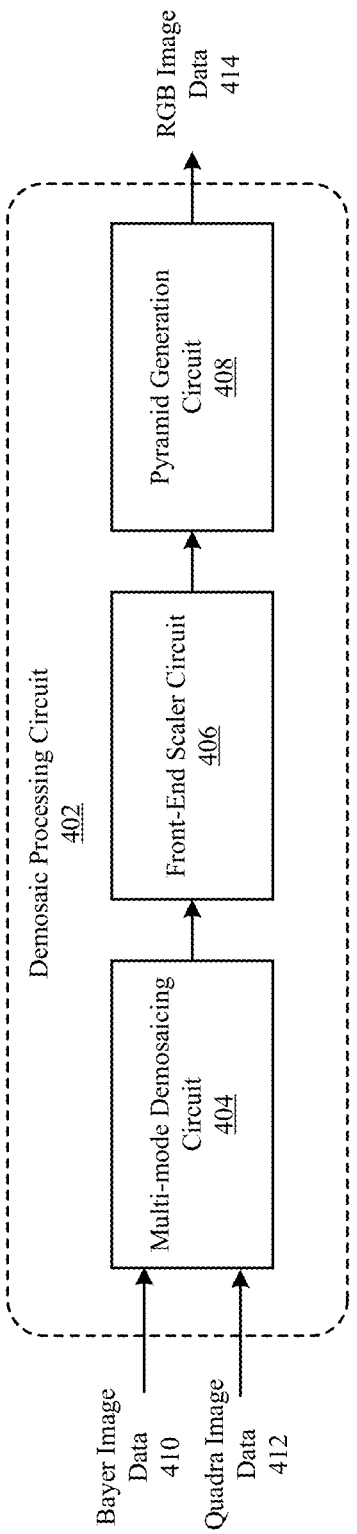
FIG. 4 is a block diagram illustrating a demosaic processing circuit, according to one embodiment.

FIG. 4 is a block diagram illustrating a demosaic processing circuit, according to one embodiment. In some embodiments, the demosaic processing circuit 402 is implemented as part of the resample processing stage 308 illustrated in FIG. 3.

The demosaic processing circuit 402 includes a multi-mode demosaicing circuit 404, a front-end scaler circuit 406, and a pyramid generation circuit 408. The multi-mode demosaicing circuit 404 is configured to receive raw image data from the image sensor 202, and to demosaic the received image data to output full-color image data. For example, as discussed above, demosaicing may include operations for converting and/or interpolating missing color samples from the raw image data (e.g., Bayer image data) to output image data into a full-color domain (e.g., RGB image data), and may include low pass directional filtering on interpolated samples to obtain full-color pixels.

The multi-mode demosaicing circuit 404 is configured to receive raw image data in a plurality of different image formats. For example, in some embodiments, the image sensor 202 may be configured to operate in a first mode to capture raw image data in a first format, and a second mode to capture raw image data in a second format. In some embodiments, the first format may correspond to Bayer image data 410, while the second format corresponds to Quad Bayer image data 412 (hereinafter also referred to as "Quadra image data"). In some embodiments, the multi-mode demosaicing circuit 404 receives image data in different raw image formats (e.g., Bayer image data 410 and Quadra image data 412) from different image sensors 202.

Figure 5A:
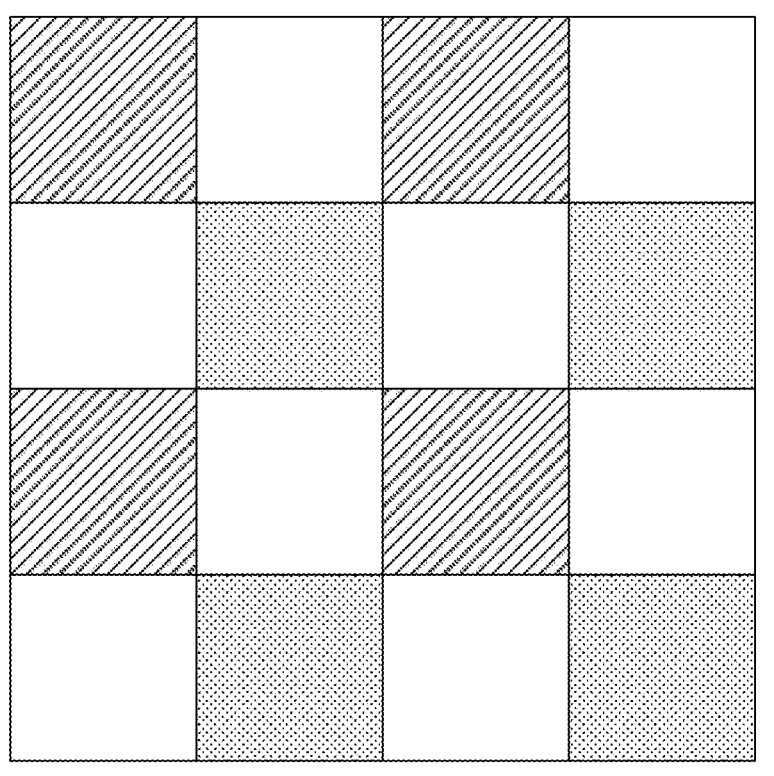
FIGS. 5A and 5B illustrate examples of raw image data in the Bayer image format and Quad Bayer image format, in accordance with some embodiments.
Figure 5A:
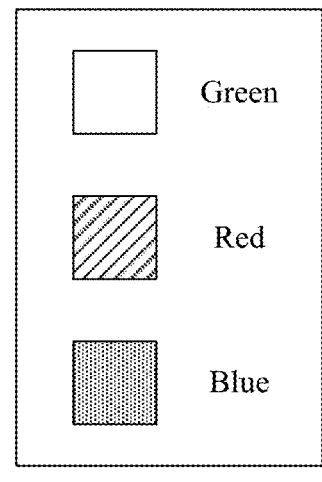
Figure 5B:
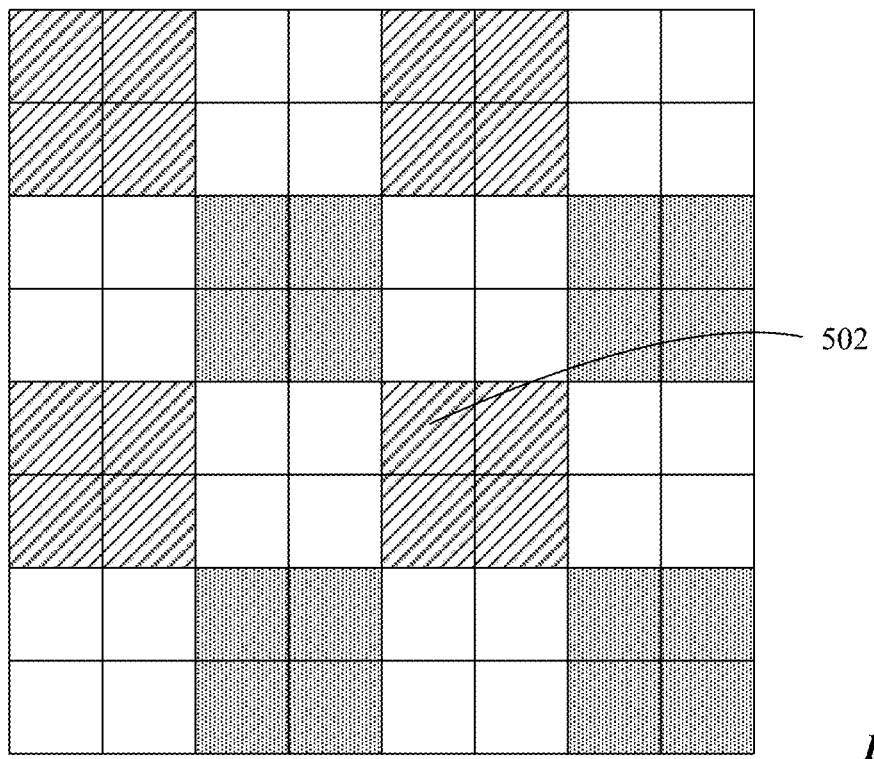

FIGS. 5A and 5B illustrate examples of raw image data in the Bayer image format and Quadra image format, in accordance with some embodiments. Each pixel in the raw image data corresponds to a particular color component: red (R), blue (B), or green (G). As illustrated in FIG. 5A, in Bayer raw image data, each row of Bayer image data contains alternating green pixels and non-green pixels, where the non-green pixels the rows alternate between red and blue. On the other hand, as illustrated in FIG. 5B, in Quadra raw image data, the captured pixels are grouped into 2×2 blocks, with each 2×2 block of pixels being of the same color.

In some embodiments, the image sensor 202 may be a 48 megapixel sensor configured to capture Quadra image data when zoomed in, and Bayer image data when zoomed out. For example, when zoomed in, a center region of pixels of the image sensor is used to capture image data as Quadra image data. However, when zoomed out, blocks of 2×2 pixels may be combined to form one pixel of Bayer image data, resulting in a wider view captured with larger, lower-resolution pixels. In some embodiments, the image sensor 202 may switch between Quadra and Bayer image modes depending upon zoom factor, an amount of luminance in a scene, and/or other factors.

The front-end scaler circuit 406 is configured to receive the full-color image data generated by the multi-mode demosaicing circuit 404 and perform additional post-processing operations on the received image data, such as removal of color aliasing artifacts near luminance edges, dot-removal to remove dot-artifacts produced by the demosaicing circuit, etc. In addition, the front-end scaler circuit 406 may scale the received image data based on the requirements of the subsequent operations to be performed on the image. In some embodiments, downscaling is performed to reduce an amount of computation required in the back-end of the pipeline, while upscaling may be performed to improve fusion quality when the raw pyramid is used in temporal filtering.

For example, in some embodiments the scaling circuit 406 may operate in a first non-scaling mode in which the front-end scaler circuit 406 performs chroma aliasing artifact suppression and/or dot-removal operations, but does not perform any scaling, or a scaling mode in which downsampling or upscaling with chroma suppression is performed following chroma suppression and/or dot-removal operations. In some embodiments, scaling is performed by converting received full-color image data to YCC image data and from 4:4:4 format to 4:2:2 format by smoothing and downsampling the chrominance to save line buffer space, followed by vertical resampling and horizontal resampling based on the desired scale to produce an output image. As such, in some embodiments, the non-scaling mode may also be referred to as 4:4:4 mode, while the scaling mode is referred to as 4:2:2 mode.

The pyramid generation circuit 408 is configured to generate a pyramid containing multiple octaves representing multiple scales of an input image. In some embodiments, the pyramid generation circuit 408 receives full-color image data generated by the front-end scaler circuit 406, and generates at least two octaves corresponding to at least a full-resolution luminance image (Scale 0) and a scaled full-color image (Scale 1). In other embodiments, the pyramid generation circuit 408 may receive raw image data (e.g., Bayer image data 410 and/or Quadra image data 412) for which to generate a raw image pyramid, bypassing the multi-mode demosaicing circuit 404 and the front-end scaler circuit 406.

Figure 6:
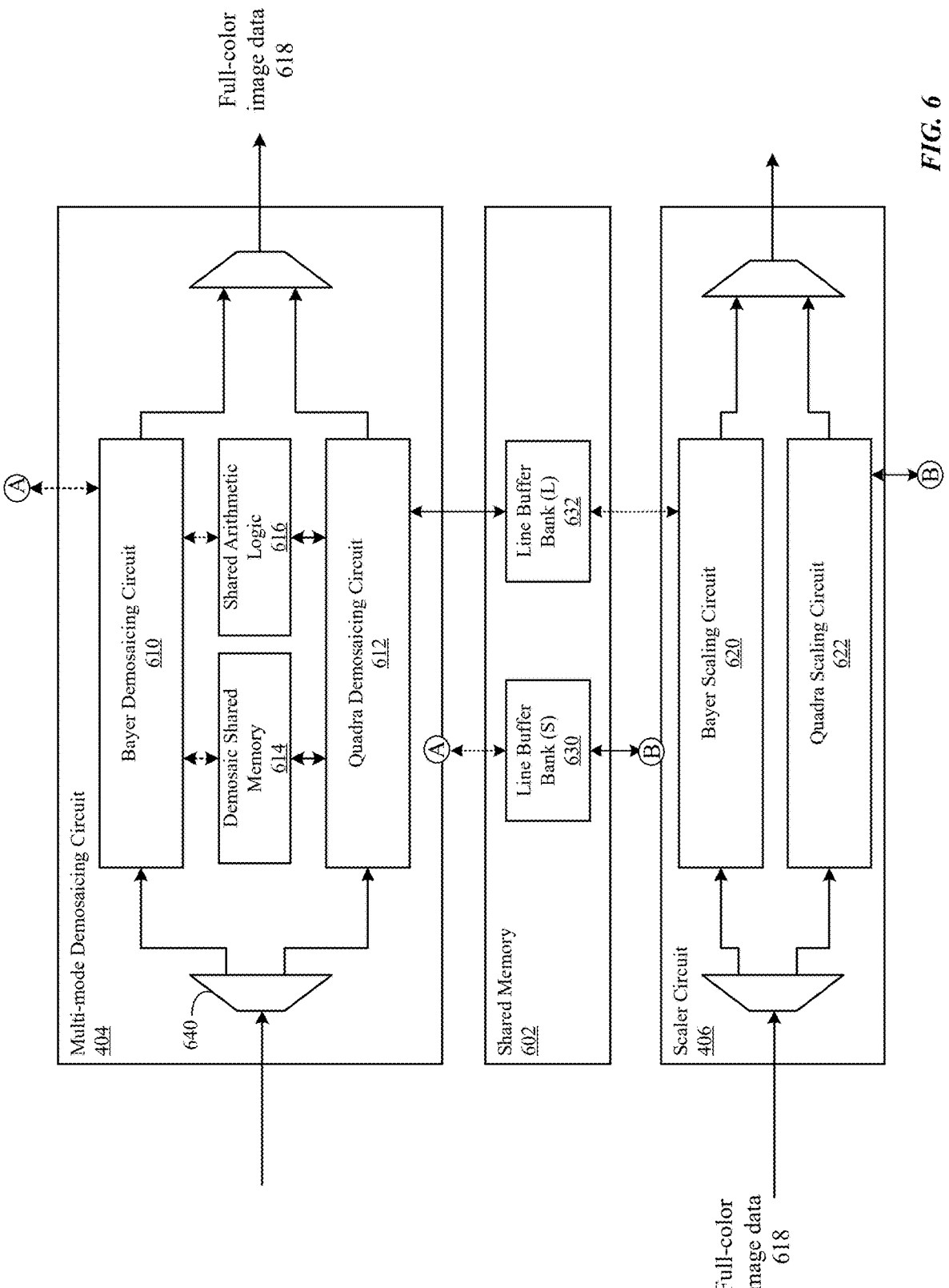
FIG. 6 is a block diagram of a more detailed view of the multi-mode demosaicing circuit and the scaling circuit, in accordance with some embodiments.

FIG. 6 is a block diagram of a more detailed view of the multi-mode demosaicing circuit 404 and the scaling circuit 406, in accordance with some embodiments. As illustrated in FIG. 6, the multi-mode demosaicing circuit 404 may comprise different circuitry for demosaicing image data received in different image formats, such as a Bayer demosaicing circuit 610 for demosaicing Bayer image data, and a Quadra demosaicing circuit 612 for demosaicing Quadra image data. The multi-mode demosaicing circuit 404 includes logic circuitry 640 (e.g., a demultiplexor) configured to receive raw image data, determine a format of the received image data, and transmit the received image data to an appropriate demosaicing circuit for demosaicing (e.g., Bayer image data to the Bayer demosaicing circuit 610, or Quadra image data to the Quadra demosaicing circuit 612) to output full-color image data 618.

The Bayer demosaicing circuit 610 and the Quadra demosaicing circuit 612 access a demosaic shared memory 614 for use as working memory when performing demosaicing operations on received image data. In some embodiments, the demosaic shared memory 614 includes a set of line buffers used by the Bayer demosaicing circuit 610 and the Quadra demosaicing circuit 612 for storing working data when performing linear interpolation, gradient calculations, gaussian filtering, weighted averaging, etc. In some embodiments, the multi-mode demosaicing circuit 404 is configured such that only one of the Bayer demosaicing circuit 610 and the Quadra demosaicing circuit 612 are operating at a given time. As such, the Bayer demosaicing circuit 610 and the Quadra demosaicing circuit 612 may each utilize the full capacity of the demosaic shared memory 614 during operation.

In addition, the Bayer demosaicing circuit 610 and the Quadra demosaicing circuit 612 may utilize shared arithmetic logic 616 when demosaicing image data. For example, in some embodiments, the shared arithmetic logic 616 includes circuitry for performing operations such as division of fixed numbers, interpolation functions, logarithm and/or exponential functions, algebraic functions, etc. used by both the Bayer demosaicing circuit 610 and the Quadra demosaicing circuit 612. For example, in some embodiments, the Bayer demosaicing circuit 610 and the Quadra demosaicing circuit 612 may both include a gradient filter and/or a weighted averaging circuit that make use of the shared arithmetic logic 616 for performing certain operations.

The front-end scaler circuit 406 is configured to receive full-color image data 618 generated by the multi-mode demosaicing circuit 404, and includes one or more scaling circuits configured to performing scaling operations based on different image formats in which the image data was originally received by the multi-mode demosaicing circuit 404. For example, as illustrated in FIG. 6, the front-end scaler circuit 406 includes a Bayer scaling circuit 620 configured to perform scaling on image data that was originally received in Bayer format, and a Quadra scaling circuit 622 configured to perform scaling on image data originally received in Quadra format. In other words, even though the image data 618 output by the multi-mode demosaicing circuit 404 and received by the front-end scaler circuit 406 may be full-color RGB image data regardless of whether the multi-mode demosaicing circuit 404 originally received the image data as Bayer image data or Quadra image data, the front-end scaler circuit 406 may be configured to perform different operations on the image data 618 depending on whether it was originally Bayer or Quadra image data.

In some embodiments, the front-end scaler circuit 406 performs different post-processing operations on the image data 618 based on its original raw image format, due to differences in how image data of different formats may be demosaiced. For example, because the pixels of Quadra image data are arranged in 2×2 blocks, pixels of the same color may have neighboring pixels of different colors, causing interpolation issues that may lead to poor diagonal sampling. In some embodiments, the Quadra scaling circuit 622 performs additional post-processing operations, e.g., additional dot-fix and chroma suppression operations, in comparison to the Bayer scaling circuit 620, e.g., to refine diagonal lines to compensate for poor diagonal sampling when interpolating Quadra raw image data, whereas such operations may not be necessary when post-processing Bayer raw image data, in which the position of green pixels are equally distributed relative to each non-green pixel of the raw image data.

The multi-mode demosaicing circuit 404 and the front-end scaler circuit 406 access a shared memory 602 for use as working memory when performing demosaicing, post-processing, and scaling operations. In some embodiments, the shared memory 602 contains multiple banks of line buffers usable by both the multi-mode demosaicing circuit 404 and the front-end scaler circuit 406. In some embodiments, the shared memory 602 contains a first bank of line buffers 630 and a second bank of line buffers 632, where the second bank of line buffers 632 contains a larger number of line buffers in comparison to the first bank 630.

FIG. 6 illustrates access by the Bayer demosaicing circuit 610, Quadra demosaicing circuit 612, Bayer scaling circuit 620, and Quadra scaling circuit 622 to the line buffer banks 630 and 632 (as well as access by the Bayer demosaicing circuit 610 and Quadra demosaicing circuit 612 to the demosaic shared memory 614 and shared arithmetic logic 616) during different modes of operation by the demosaic processing circuit). For example, FIG. 6 illustrates access to the line buffer banks 630/632 during a first mode of processing of raw Bayer image data using dotted lines, while access to the line buffer banks 630/632 during a second of processing raw Quadra image data using solid lines.

Because the Quadra demosaicing circuit 612 may utilize additional working memory when demosaicing Quadra image data in comparison to the Bayer demosaicing circuit 610 when demosaicing Bayer image data, the Quadra demosaicing circuit 612 may access the second bank of line buffers 632 when performing demosaicing (as indicated by a solid line between Quadra demosaicing circuit 612 and the second line buffer bank 632), while the Bayer demosaicing circuit 610 accesses the smaller first bank of line buffers 630 when performing demosaicing (as indicated by a dotted line between Bayer demosaicing circuit 610 and the first line buffer bank 630, via "A"). On the other hand, the Quadra scaling circuit 622 may access the first bank of line buffers 630 when performing post-processing and scaling on image data generated by the Quadra demosaicing circuit 612 (via "B"), while the Bayer scaling circuit 620 accesses the second bank of line buffers 632 when performing post-processing and scaling on image data generated by the Bayer demosaicing circuit 610. In other words, the Quadra scaling circuit 622 may have access to smaller amount of memory of the shared memory 602 in comparison the Bayer scaling circuit 620.

In some embodiments, the Quadra scaling circuit 622 performs its post-processing and scaling operations with reduced memory consumption in comparison to the Bayer scaling circuit 620 by discarding a portion of its received image data (e.g., certain lines of image data), and later reconstructing the discarded image data (e.g., reconstructing the discarded lines through interpolation).

Although FIG. 6 illustrates the scaler circuit 406 as having separate scaling circuits for Bayer and Quadra, it is understood that in some embodiments, the same scaling circuit or portions thereof may be used for scaling both Bayer and Quadra image data. In some embodiments, the scaler circuit 406 may utilize different settings when scaling Quadra image data compared to when scaling Bayer image data, such as utilizing different filter kernels, performing different functionality (e.g., to reduce memory consumption when processing Quadra image data in comparison to Bayer image data, as discussed above), etc.

By utilizing shared memory 602 used by both the multi-mode demosaicing circuit 404 and the front-end scaler circuit 406, Quadra image processing functionality may be added to legacy Bayer image processing circuits, without significantly increasing an amount of area on chip needed for memory. For example, because Quadra demosaicing may utilize larger filters in comparison to Bayer demosaicing, thus requiring additional memory, operations of the front-end scaler circuit are modified (e.g., by discarding a portion of the image data so that a smaller amount of image data needs to be processed) to reduce memory usage, allowing for the combined circuit to utilize a similar amount of memory when processing Quadra image data in comparison to when processing Bayer image data, so that the same memory (e.g., shared memory 602) is efficiently utilized in either image processing mode.

Quad Bayer Demosaicing

Figure 7:
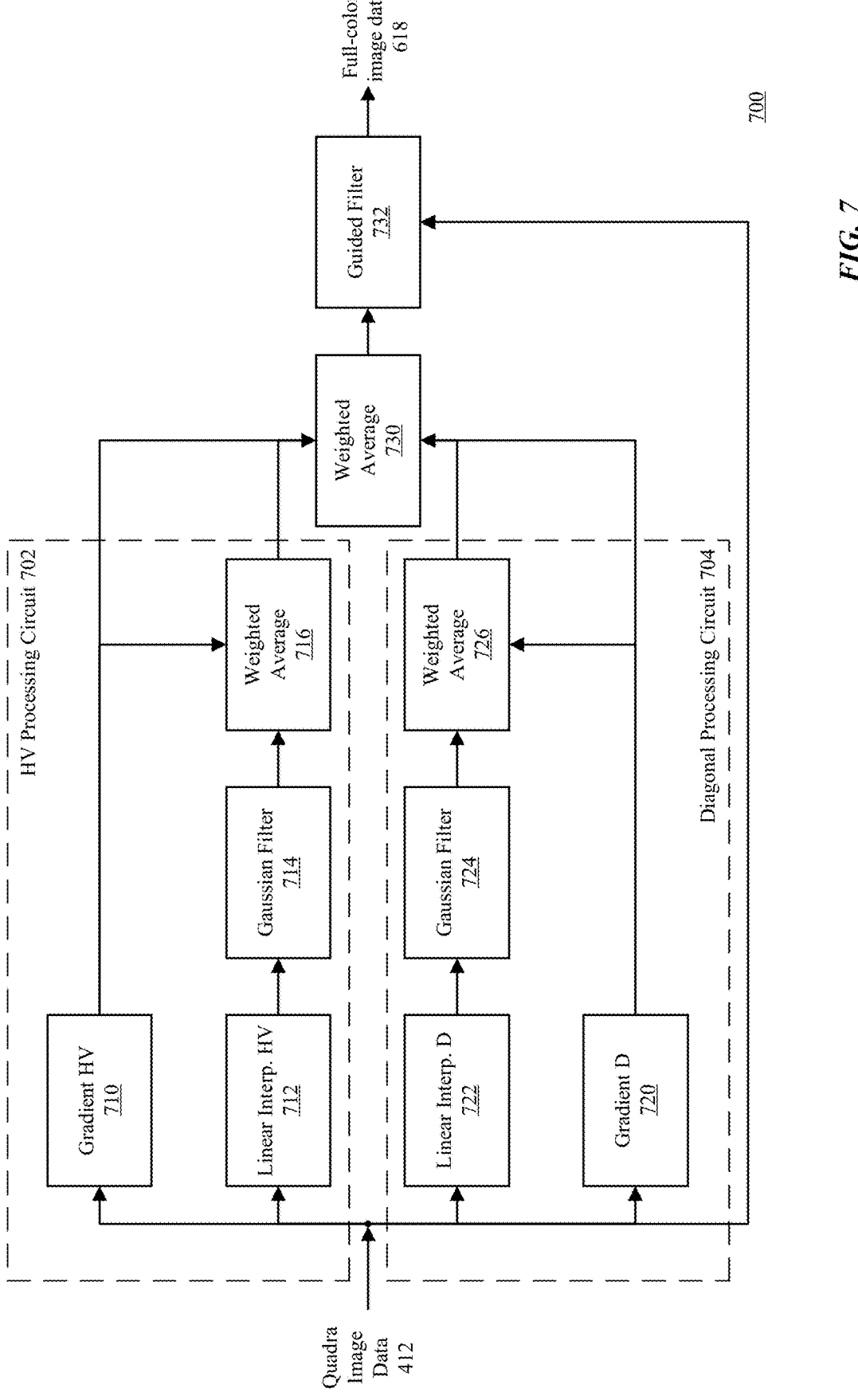
FIG. 7 illustrates a block diagram of a Quad Bayer demosaicing circuit, in accordance with some embodiments.

FIG. 7 illustrates a block diagram of a Quadra demosaicing circuit, in accordance with some embodiments. The Quadra demosaicing circuit 700 illustrated in FIG. 7 may correspond to the Quadra demosaicing circuit 612 illustrated in FIG. 6. The Quadra demosaicing circuit 700 is configured to demosaic received raw Quadra image data 412 by first producing a complete green color image, and, based on the produced green image, generate red and blue color images to produce full-color image data 618 (e.g., RGB image data).

The Quadra demosaicing circuit 700 includes a Horizontal/Vertical (HV) processing circuit 702 and a diagonal processing circuit 704, each containing a respective linear interpolation circuit (e.g., linear interpolation HV circuit 712 and linear interpolation diagonal circuit 722) and a respective directional Gaussian filter circuit (e.g., Gaussian filter circuits 714 and 724) to perform linear interpolation and filtering on the raw Quadra image data in the horizontal/vertical and diagonal directions respectively, a respective gradient calculation circuit (e.g., gradient HV circuit 710 and gradient diagonal circuit 720) to determine directional gradients based on the raw Quadra image data, and respective aggregation circuits (e.g., weighted averaging circuits 716 and 726) to output an aggregation of the generated linear interpolation data based on the determined gradient data. The output of the HV processing circuit 702 and the diagonal processing circuit 704 is aggregated by a weighted average circuit 730 to generate a complete green image. The guided filter 732 uses the complete green image and the raw Quadra image data to generate complete red and blue images, which are combined with the complete green image to yield a full-color RGB image. These components will be discussed in greater detail below.

Although FIG. 7 illustrates a Quadra demosaicing circuit 700 with separate HV and diagonal processing circuits 702 and 704, it is understood that in some embodiments, the HV and diagonal processing circuits may share circuit elements. For example, in some embodiments, a single interpolation circuit may be used to perform interpolation in HV and diagonal directions.

Quad Bayer Demosaicing: Linear Interpolation

The linear interpolation HV circuit 702 and linear interpolation diagonal circuit 722 (collectively, linear interpolation circuits 702/722) of the Quadra demosaicing circuit 700 are each configured to perform linear interpolation on the raw Quadra input data in specified directions, to generate a green value for each non-green pixel of the image data. For example, to perform interpolation in the horizontal direction, the linear interpolation circuit HV circuit 702 determines, for each non-green pixel, a green value based on the values of nearby pixels along the horizontal direction (e.g., on the same row). As such, the linear interpolation circuit is configured to output an image of green pixels, including the original green pixels of the image data, and interpolated green pixels replacing the red and blue pixels of the original image data.

Figures 8A, 8B:
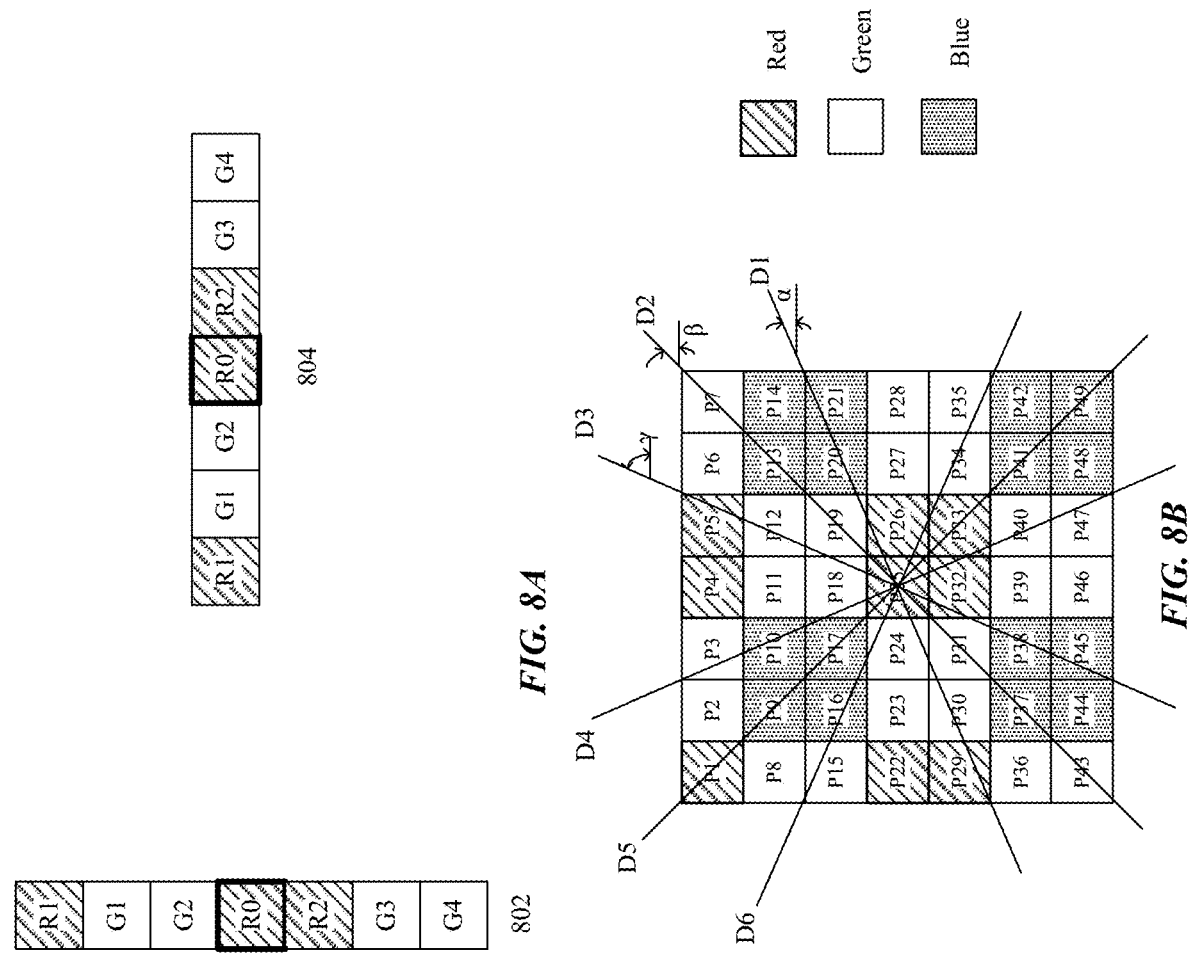
FIG. 8A illustrates examples of interpolation kernels that may be used to perform linear interpolation in horizontal and vertical directions, in accordance with some embodiments.
FIG. 8B is a diagram illustrating diagonal lines for generating green pixel data interpolated in diagonal directions, in accordance with some embodiments.

FIG. 8A illustrates examples of interpolation kernels that may be used to perform linear interpolation in horizontal and vertical directions, in accordance with some embodiments. The example kernels illustrated in FIG. 8 may be used for interpolating a red pixel within the received raw Quadra image data, e.g., the red pixel 502 illustrated in FIG. 5. Kernels 802 and 804 correspond to a vertical interpolation kernel and a horizontal interpolation kernel, respectively, used by the linear interpolation HV circuit 712 for interpolating a red pixel R0. For example, a green value for the pixel R0 may be determined based on the values of nearby green pixels G1 through G4, e.g., a weighted average of G1 through G4.

FIG. 8B illustrates diagonal lines used by the linear interpolation diagonal circuit 722, for interpolating to generate two diagonally interpolated green pixel data (Gd1, Gd2) at a location corresponding to center red pixel P25, according to some embodiments. Specifically, a green value Gd1 interpolated along a first diagonal direction (along direction D2) is generated by processing values of green pixels placed along diagonal lines D1 through D3 while another green value Gd2 interpolated along a second diagonal direction (along direction D5) is generated by processing values of green pixels placed along diagonal lines D4 through D6.

For example, a green value at the location of red pixel P25 interpolated in directions D1, D2 and D3. First, interpolation values L1, L2 and L3 in D1, D2 and D3 directions are determined, respectively. Interpolation value L1 interpolated in direction D1 is obtained by equation $(G36+G30+G24+G19+2)/4$ (where G36, G30, G24 and G19 represent green values of pixels P36, P30, P24 and P19, respectively); a green value at the location of red pixel P25 is determined as interpolation value L2 interpolated in direction D2 by equation $(G43+3\times G31+3\times G19+G7+4)/8$ (where G43, G31, G19 and G7 represent green values of pixels P43, P31, P19 and P7, respectively); and a green values at the location of red pixel P25 is determined as interpolation value L3 interpolated in direction D3 by equation $(G12+G18+G31+G6+2)/4)$ (where G12, G18, G31 and G6 represent green values of pixels P12, P18, P31 and P6, respectively).

To combine these interpolated values, corresponding weights W1 (corresponding to interpolation value L1), W2 (corresponding to interpolation value L2) and W3 (corresponding to interpolation value L3) are obtained. Weight W1 corresponds to direction D1, weight W2 to direction D2 and weight W3 to direction D3. Weight W1 is obtained as abs $(G24-G19)+abs(G23-G18)+abs(G39-G34)+abs(G40-G35)$ (where G24, G19, G23, G18, G39, G34, G40 and G35 represent green values of pixels P24, P19, P23, P18, P39, P34, P40 and P35, respectively). W2 is obtained as abs $(G24-G18)+abs(G31-G19)+abs(G40-G34)+abs(G27-G39)$ (where G24, G18, G31, G19, G40, G34, G27 and G39 represent green values of pixels P24, P18, P31, P19, P40, P34, P27 and P39, respectively). Weight W3 is obtained as $abs(G18-G31)+abs(G11-G24)+abs(G27-G40)+abs(G34-G47)$ (where G18, G31, G11, G24, G37, G40, G34 and G47 represent green values of pixels P18, P31, P11, P24, P37, P40, P34 and P47, respectively). Then the intermediate values x1 and x2 calculated as, $(L1\times W2+D2\times X1)/(W1+W2)$ and $(L2\times W3+L3\times W2)/(W2+W3)$, respectively. Weights W1 and W3 are updated as $(W1+W2+1)/2$ and (W2+W3+1)/2 respectively. The final green value Gd1 at the location of pixel P25 interpolated in direction D2 is obtained by the following equation, (x1×W3+x2×W1)/(W1+W3). Similarly, the final green value Gd2 at the location pixel P25 interpolated in direction D2 is obtained.

As shown in FIG. 8B, diagonal interpolations in three directions D1, D2, D3 with different slanted angle of $\alpha$, $\beta$, $\gamma$ are used to obtain a first diagonally interpolated green pixel value Gd1 (along direction D2) while the other three directions D4, D5, D6 also with different slated angles of $180°-\alpha$, $180°-\beta$, $180°-\gamma$ are used to obtain a second diagonally interpolated green pixel value Gd2 (along direction D5). In this way, a more accurate interpolated values of the green pixel values in diagonal directions may be obtained.

The pixel configuration of FIG. 8B is merely an example, and the red, green and blue pixels may be arranged in various other configurations. For example, a blue pixel may be placed at the center of the pixel block.

In some embodiments, the value of each interpolated pixel is calculated based on a low pass value (LPV) and a high pass value (HPV). The LPV is calculated based on the interpolation of the neighboring green pixels along the specified direction of interpolation, as discussed above, while the HPV is based upon the original non-green value (i.e., red or blue) of interpolated pixel. In some embodiments, the HPV may also be referred to as the residual. For example, the green value of the pixel R0 (e.g., LPV) may further be modified based upon the values of nearby red pixels along the specified direction (e.g., using the HPV or residual, which is determined based on R0, as well as nearby same-color pixels R1 and R2). For example, in some embodiments, the residual value may be determined as a function of 2*R0−R1−R2. In some embodiments, a value of the residual may be clipped based upon one or more specified threshold values.

In some embodiments, mixing information from red or blue color information (e.g., the residual) is done to enhance the resolution of the green channel. However, due to sparse sampling associated with the Quadra image format, the green pixels and red/blue pixels may not represent the same data. As such, in some embodiments, the amount of the residual that is used to modify the interpolated green value for a pixel is based upon a calculated residual weight that is based on a statistical correlation between the nearby green and red or blue pixels. In some embodiments, the green pixels used for calculating the statistical correlation may be the same pixels used to determine the interpolated LPV values for the pixels, while the red or blue pixels may include red/blue pixels near the green pixels, based on the direction of interpolation.

Figure 9:
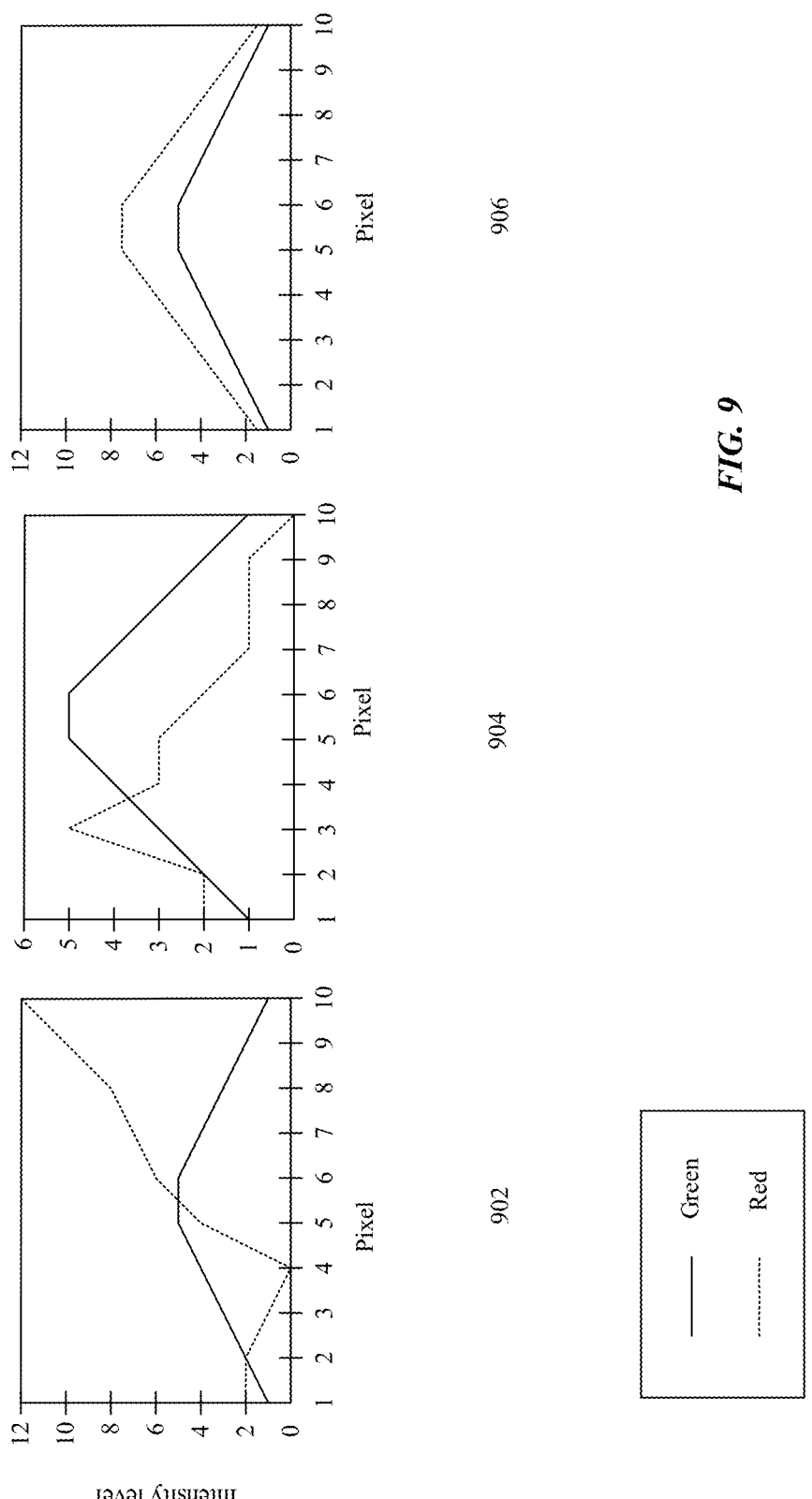
FIG. 9 illustrates example diagrams of different amount of residual values added when interpolating image data, in accordance with some embodiments.

FIG. 9 illustrates example diagrams of different amount of residual values added when interpolating image data, in accordance with some embodiments. FIG. 9 illustrates three diagrams 902, 904, and 906, each showing a different distribution of green and red pixel values surrounding a center pixel to be interpolated, where the green and red pixels exhibit different levels of correlation in each diagram. For example, diagram 902 illustrates an example where there is no correlation between the green and red signal. As such, when interpolating the center pixel, the residual weight is 0, resulting in no residual being added to the interpolated LPV value. In diagram 904, the green and red values partially correlate. As such, a percentage of the residual (e.g., ~38%) is used to modify the interpolated LPV value, based on the amount of correlation. On the other hand, if the green and red values fully correlate, e.g., as shown in diagram 906, then the full residual is added to the interpolated LPV value to generate the interpolated value for the pixel. In some embodiments, a value of the residual may be further modified based on one or more manually-configured parameters. In some embodiments, the interpolated green values are modified based on residual values for all interpolation directions. In other embodiments, modifying the interpolated green values based on a residual value is performed for only certain directions (e.g., for only horizontal and vertical directions, but not diagonal directions).

In some embodiments, prior to interpolation, the linear interpolation circuit 712/722 analyzes the pixels of the raw Quadra image data to exclude certain pixels from interpolation. For example, in some cases an image may contain pixels, referred to as "bright dots," having high saturation values relative to surrounding pixels, such as in an image of sunlight shining through foliage. In other cases, bright dots may correspond to missed defective pixels. If interpolated normally, the saturation of the pixel may be spread around to surrounding pixels, creating visual artifacts, such as an undesirable cross or box, around the bright dot. As such, in some embodiments, when interpolating a value of a given pixel, a nearby pixel may be excluded from interpolation if the value of the nearby pixel exceeds a threshold amount (e.g., excluded from being included in the interpolation of the neighboring green pixels, or from the determination of the residual value). In some embodiments, the threshold is defined based on a signal value of the pixel being interpolated. For example, in some embodiments the user may define a curve mapping threshold levels to different signal levels, where pixels above the threshold are excluded from the interpolation. In some embodiments, the signal level of the pixel being interpolated is determined based on an analysis of a neighborhood surrounding pixels (e.g., a 3×3 neighborhood of pixels), e.g., as a minimum pixel value, maximum pixel value, average pixel value, or some combination thereof of the neighborhood of surrounding pixels. The determined signal value is mapped to a threshold value for excluding bright pixels. In some embodiments, the threshold value is determined per color channel. In some embodiments, the threshold value may be set as a difference over an intensity value of the pixel being interpolated, instead of an absolute intensity level.

Quad Bayer Demosaicing: Directional Gaussian Filtering

Figure 10:
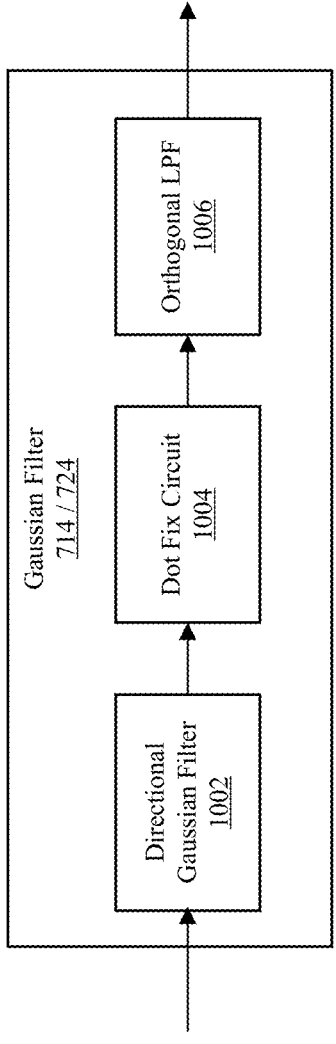
FIG. 10 illustrates a block diagram of a Gaussian filter used in the Quad Bayer demosaicing circuit, in accordance with some embodiments.

FIG. 10 illustrates a block diagram of a Gaussian filter used in the Quadra demosaicing circuit, in accordance with some embodiments. The Gaussian filter illustrated in FIG. 10 may correspond to either the Gaussian filter circuit 714 in the HV processing circuit 702, or the Gaussian filter circuit 724 in the diagonal processing circuit 704 illustrated in FIG. 7, and includes a directional Gaussian filter 1002, a dot fix circuit 1004, and an orthogonal low-pass filter (LPF) 1006.

The directional Gaussian filter 1002 is configured to smooth and reduce noise of the interpolated green pixels generated by the linear interpolation circuit 702 or 712 by applying a directional Gaussian kernel on the received pixels. The dot fix circuit 1004 is configured to perform dot fixing operations on received image data. For example, in some embodiments, the dot fix circuit 1004 is configured to remove dots by analyzing the values of a center pixel and two or more neighboring pixels along a specified direction (e.g., the same direction in which interpolation was performed) to determine a minimum, maximum and median pixel value. If a difference between the minimum and maximum exceeds a dot fix threshold value and the center pixel has either the minimum or maximum value, then the dot fix circuit 1004 sets the value of the center pixel to the determined median pixel value. In some embodiments, the directional Gaussian filter 1002 may be bypassed (e.g., by setting a strength of the directional Gaussian filter 1002 to 0), such that the interpolated green pixels generated by the linear interpolation circuit 702 or 712 is received directly by the dot fix circuit 1004.

The orthogonal LPF 1006 is configured to receive interpolated image data, and to apply a directional low-pass filter that is orthogonal to a direction in which the image data was interpolated, in order to reduce fixed pattern noise that may be generated by the interpolation. For example, when interpolating Quadra image data, noise present in certain pixels may be elongated by the interpolation, creating lines in the image in the direction of the interpolation, e.g., vertical interpolation would elongate the noise in a vertical direction, creating vertical lines. This may be especially noticeable in areas of images depicting flat surfaces or uniform colors, such as a patch of sky or a solid-color shirt. In addition, some image sensors configured to capture Quadra image data may experience gain and shift issues (e.g., electric signal cross-talk), where neighboring 2×2 blocks of green pixels may capture different raw image data even when the underlying color being captured should be the same. These differences may result in fixed pattern noise when the raw image data is interpolated.

Figure 11:
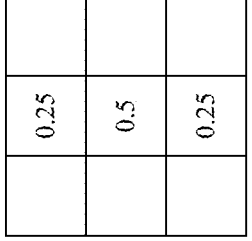
FIG. 11 illustrates examples of different kernels that may be used by orthogonal LPF, in accordance with some embodiments.
Figure 11:
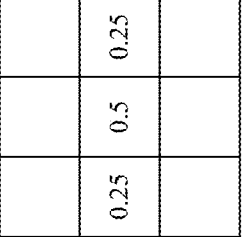

In order to reduce fixed pattern noise, the orthogonal LPF 1006 applies a low-pass filter kernel to the interpolated image data in a direction that is orthogonal to the direction in which the image data was interpolated. FIG. 11 illustrates examples of different kernels that may be used by orthogonal LPF, in accordance with some embodiments. For example, FIG. 11 illustrates a horizontal filter kernel 1102, a vertical filter kernel 1104, a first diagonal filter kernel 1106 (corresponding to the downwards right diagonal), and a second diagonal filter kernel 1108 (corresponding the an upwards right diagonal). When a horizontal LPF kernel, such as horizontal kernel 1102, is applied to image data that was vertically interpolated, the vertical lines caused by fixed pattern noise are reduced, due to blending with adjacent pixels in a horizontal direction. Thus, by applying an orthogonal LPF, false patterns caused by fixed pattern noise may be removed.

While FIG. 11 illustrates examples of directional low-pass filters that may be used by the orthogonal LPF 1106, in some embodiments, different filter kernels may be used to apply different levels of noise removal. In some embodiments, the strength of the noise removal is selected as a function of gradient strength (e.g., as determined by the gradient HV circuit 710 or gradient diagonal circuit 720). By varying noise removal based on gradient, portions of the image corresponding to real textures may be avoided (e.g., with little or no noise removal applied), while applying noise removal to portions of the image corresponding to flat areas.

Quad Bayer Demosaicing: Gradient Calculation

The gradient HV circuit 710 and gradient diagonal circuit 720 (collectively, gradient calculation circuits) are configured to calculate gradients within a received image, which are used to determine directional gradient weight values for combining image data interpolated along different directions (e.g., combining vertically-interpolated and horizontally-interpolated image data, image data interpolated in different diagonal directions).

In some embodiments, a directional gradient weight for a pixel is determined by analyzing a window of surrounding pixels (e.g., a 7×7 window). In some embodiments, due to the pixels in Quadra image data being grouped into 2×2 blocks, gradient calculation for Quadra image data may use a larger window in comparison to that used for determining gradient values for other image formats (e.g., Bayer images).

Figure 12:
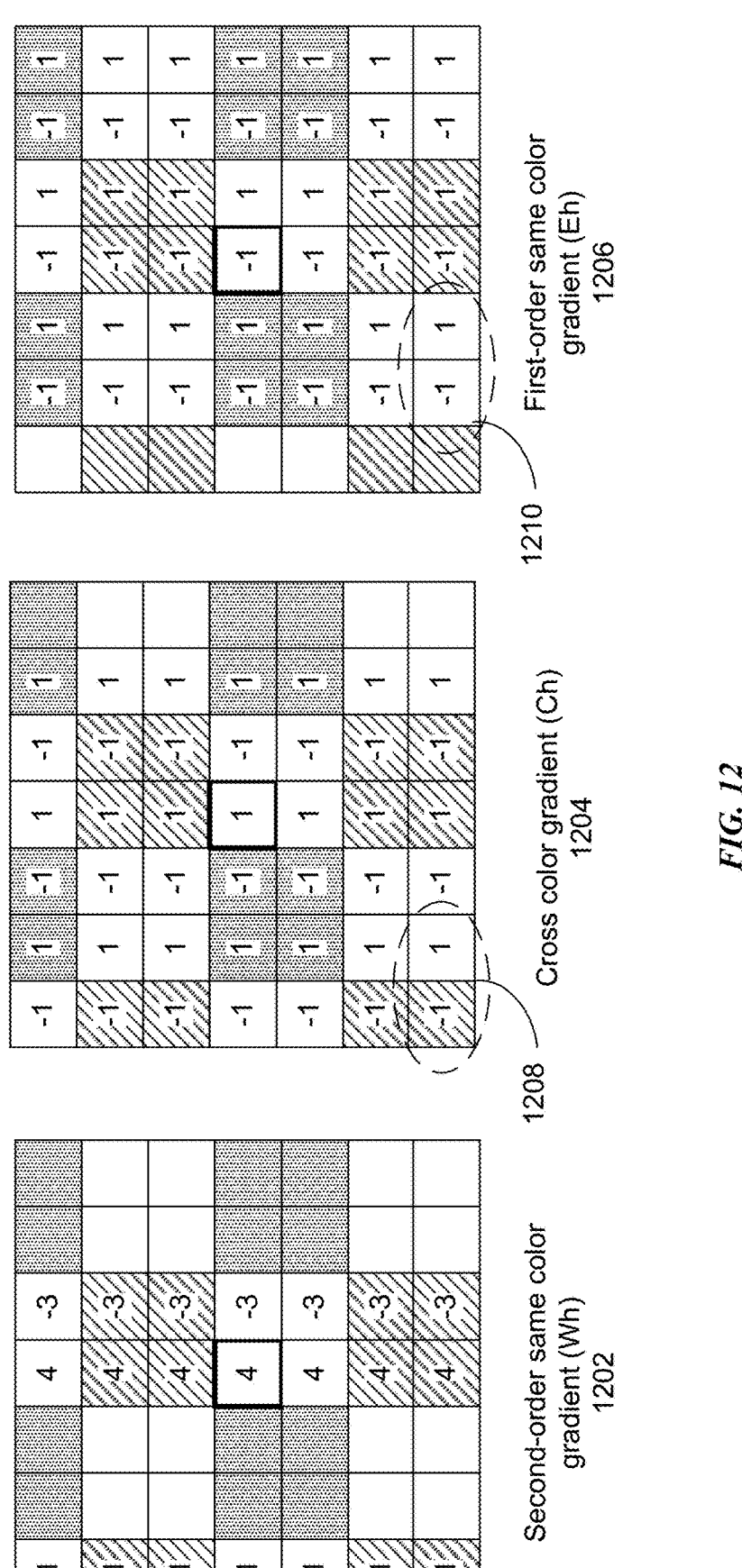
FIG. 12 illustrates examples of filter windows that may be used by the gradient calculation circuits, in accordance with some embodiments.

FIG. 12 illustrates examples of filter windows that may be used by the gradient calculation circuits, in accordance with some embodiments. The filter windows illustrated in FIG. 12 are 7×7 filter windows used for calculating gradients in the horizontal direction, although it is understood that similar filter windows may be used to calculate gradients for other directions. The numbers within the pixels in the illustrated filter windows correspond to filter coefficients, while pixels with no numbers represent pixels that are not considered in the gradient calculation using that particular filter window. The pixels of each row are aggregated (e.g., summed) based on their respective filter coefficient values, and the values for each row are aggregated to determine a final gradient value for the center pixel.

Filter window 1202 is a second-order filter for finding a gradient in a same color. For each horizontal row of the filter window 1202, pixels of the same color channel are analyzed, and the results of each row are aggregated to generate an estimated horizontal gradient weight value Wh for the center pixel of the window (e.g., an absolute value of a weighted sum of the indicated pixels in each row). Although the filter window 1202 only shows using pixels of certain columns in each row of the filter window (e.g., first, fourth, and fifth columns corresponds to pixels of a same color in each row) for finding the second-order same-color gradient, it is understood that in other embodiments, the filter window 1202 may also take into account color values of additional columns as well. For example, in some embodiments, a result value for each row may be based on a first aggregation of pixels of a first color (e.g., first, fourth, and fifth columns as illustrated in FIG. 12) and a second aggregation of pixels of a second color (e.g., second, third, fifth, and sixth column pixels, having weight values of 1, 2, −2, −1, respectively).

However, because pixels in Quadra image data are grouped into 2×2 blocks, there is a large gap between pixels of the same color channel. In addition, as shown in FIG. 12, the analyzed pixels in each row are not symmetrical. These issues caused by the format of Quadra image data may lead to inaccuracies in the determined gradient weight value Wh if only the second-order filter window 1202 is used.

In some embodiments, in order to improve an accuracy of the determined gradient weight value Wh, additional filter windows are applied to the Quadra image data, the results of which are combined to yield a more accurate gradient value for the center pixel. FIG. 12 illustrates a second filter window 1204 that determines a cross-color gradient value Ch. To determine the cross-color gradient, each row is divided into a plurality of cross-color pairs, each pair including a green pixel and a non-green pixel. For example, the cross-color pair 1208 includes a left red pixel, and a right green pixel. A value for each row is calculated as an aggregation (e.g., sum) of the absolute values of the differences between the pixels of each cross-color pair (e.g., for the cross-color 1208, an absolute value of the value of the right green pixel subtracted by the left red pixel). The values of the rows are then aggregated to determine the cross-color gradient Ch for the center pixel.

In addition, a third filter window 1206 corresponding to a first-order same-color filter may also be used to determine a gradient error Eh with each color. As shown in FIG. 12, each row of the third filter window 1206 is divided into a plurality of same-color pairs. For example, the same-color pair 1210 includes a pair of adjacent green pixels. A value for each row is calculated as an aggregation (e.g., sum) of the absolute values of the differences between the pixels of each same-color pair. The values of the rows are then aggregated to determine the gradient error value Eh.

Figure 13:
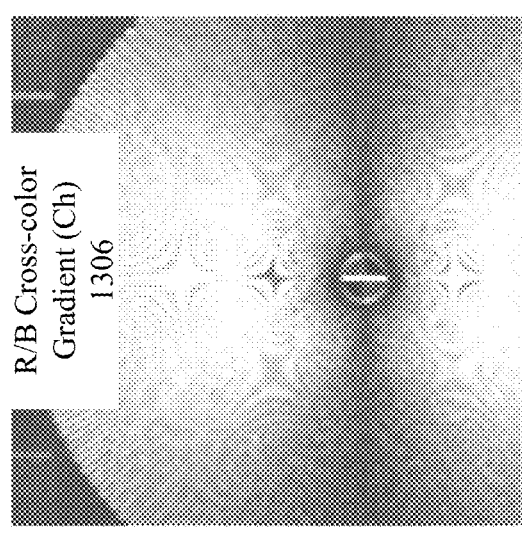
FIG. 13 illustrates an example of how the different filter windows for determining same-color gradient, cross-color gradient, and gradient error are combined to generate a final gradient value, in accordance with some embodiments.
Figure 13:
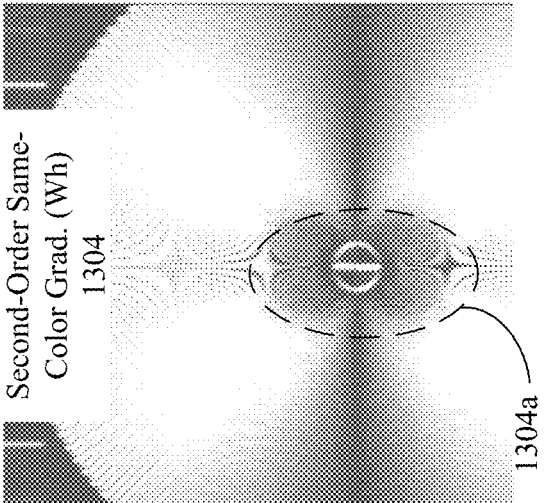
Figure 13:
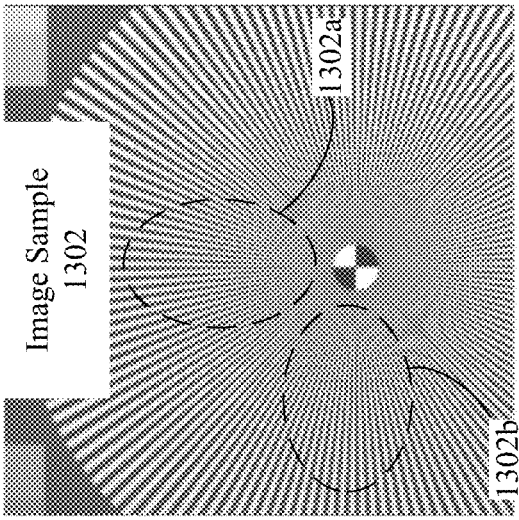
Figure 13:
Figure 13:
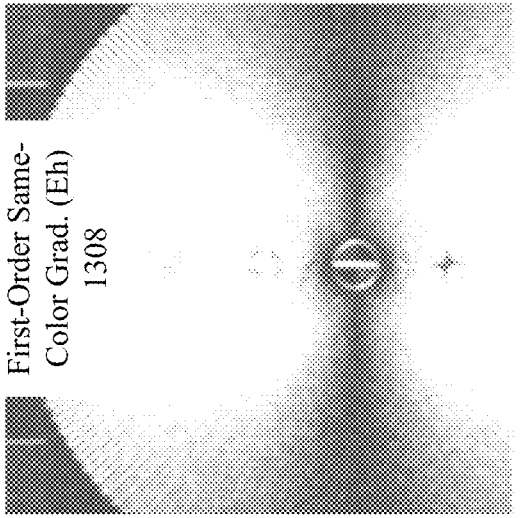

FIG. 13 illustrates an example of how the different filter windows for determining same-color gradient, cross-color gradient, and gradient error are combined to generate a final gradient value, in accordance with some embodiments. The original image sample 1302 is an example image of a Siemens star, and contains regions where strong horizontal gradients are present (e.g., region 1302a), and other regions (e.g., region 1302b) with little to no horizontal gradients.

The green gradient image 1304 illustrates a result of applying the first filter window 1202 on the original image 1302 to determine horizontal a second-order same-color (e.g., green) gradient weight Wh. In the illustrated image, white areas represent areas with detected gradients, while black areas correspond to areas to little or no detected gradient. As shown in FIG. 13, the green gradient image 1304 is able to detect gradients in region 1302a, but is not able to detect gradients in areas closer to the center of the Siemens star, such as areas where the image content nears Nyquist frequency, as shown in the region 1304a, due to the large gaps between analyzed pixels of the same-color gradient filter window 1202 used to determine the gradient.

In order to calculate more accurate gradient values, cross-color and gradient error filters (e.g., corresponding to filter windows 1204 and 1206) are used to supplement the gradient values determined using the first filter window 1202. For example, when the cross-color gradient filter window 1204 is applied to the original image 1302, cross-color gradient values Ch as shown in the cross-color gradient image 1306 are obtained. As shown in the cross-color gradient image 1306, application of the cross-color gradient filter window 1204 is able to yield more accurate gradient information near the center of the Siemens star, but also results in additional noise in other areas of the image.

In addition, the gradient error values Eh as shown in the same-color gradient image 1308 are obtained when the first-order same-color filter window 1206 is applied on the original image 1302. The gradient error values Eh may be used to guide how much of the cross-color gradient Ch is used to modify the original same-color gradient Wh.

In some embodiments, the cross-color gradient Ch is normalized by using the cross-color gradient values calculated along another direction. For example, each gradient calculation circuit is configured to determine gradient values in at least two directions (e.g., the gradient HV circuit 710 configured to calculate horizontal and vertical gradients, and gradient diagonal circuit 720 configured to calculate diagonal gradients). As such, in the case of horizontal gradient calculation as discussed above, the horizontal cross-color gradient Ch is normalized using the vertical cross-color gradient Cv (not shown in FIG. 13), the result of which is modified by the gradient error Eh and used to supplement the original second-order same-color gradient Wh. For example, in some embodiments, the final horizontal gradient value Wh is calculated as Wh+Eh*(Ch/(Ch+Cv)). The final combined gradient image 1310 illustrates the resulting gradient that is obtained when this aggregation is performed, showing more accurate gradient values near the center of the image, while exhibiting less noise in other areas of the image. As such, by combining the gradient data obtained using the second-order filter with first-order and cross-color filter data, gradient detection issues stemming from the unique image format of Quadra relative to Bayer, such as greater distances between same-color pixels and non-symmetric filter kernels, are reduced, yielding more accurate gradient values compared to what would be been possible with only the original second-order filter.

Although FIGS. 12 and 13 illustrate example methods of gradient determination in the context of horizontal gradients, it is understood that the similar techniques may be applied to determine gradients in other directions, such as vertical and/or diagonal gradients. In some embodiments, gradients corresponding to different directions may be determined differently. For example, in some embodiments, horizontal and vertical gradients are determined based upon a first-order gradient, second-order gradient, and cross-color gradient, such as that described above in relation to FIGS. 12 and 13, while diagonal gradients are determined based upon first-order gradient but not second-order gradient (e.g., due to the different distribution of possible sample points along the diagonal direction in comparison to horizontal and vertical directions). For example, in some embodiments, diagonal gradients may be determined by first applying a filter mask to the raw image data to generate, for each pixel, a first-order gradient corresponding to an aggregation of differences between adjacent pixels along the diagonal, after which a filter (e.g., sum filter of a 3×3 pixel window) is applied to determine a final diagonal gradient weight value (e.g., Wd1 and Wd2) for each pixel.

In some embodiments, gradient weight values are calculated only for a subset of pixels of the received image data (e.g., Quadra image data 412). For example, in some embodiments, the gradient calculation circuits 710/720 are configured to calculate gradient weight values for pixels of certain color channels (e.g., only red and blue pixels, but not green pixels). Although FIGS. 12 and 13 illustrate filter windows centered on a green pixel, it is understood that gradients for red or blue pixels may be determined using the same techniques and similar filter windows centered on red or blue pixels.

Weighted average circuits 716 and 726 are configured to combine the interpolated image data generated by the linear interpolation circuits 712/722, based upon the gradients generated by the gradient calculation circuits 710/720. For example, the weight average circuit 716 combines horizontally interpolated green image data (Gh) and vertical interpolated green image data (Gv) generated by the linear interpolation HV circuit 712 (and filtered through the Gaussian filter 704), based on horizontal and vertical gradient weight values Wh and Wv generated by the gradient HV calculation circuit 710, to generate a weighted average Ghv. Similarly, the weight average circuit 726 combines green image data (Gd1 and Gd2) interpolated along two different diagonal directions, based on gradient weight values (Wd1 and Wd2) along those diagonal directions to generate a weighted average Gd. In some embodiments where gradient values are determined for only a subset of pixels of the received image data, the gradient weight values used for determining a weighted average for pixel for which gradient values were not determined may use gradient values determined for a nearby pixel, or an aggregation of gradient values of two or more nearby pixels.

Weighted average circuit 730 is configured to combine the output image data of the weighted average circuits 716 and 726, corresponding to a full green image processed in the horizontal and vertical directions Ghv and a full green image processed in both diagonal directions Gd, into a final full green image.

Quad Bayer Demosaicing: Guided Filter

The guided filter 732 produces pixels in red and blue color image planes using the covariance between generated full resolution green image pixels and counterpart pixels in interpolated blue/red image planes as well as the brightness of the green pixels. The guided filter 732 may calculate missing pixel values by interpolating pixel values in the interpolated blue/red image planes. The interpolated blue/red image planes may be generated by using a low-pass filter on the blue/red pixels in the raw image. Then, the guided filter 732 add high frequency components from the green image plane onto the red and blue values based upon covariances and the brightness of the green pixels.

Figure 14:
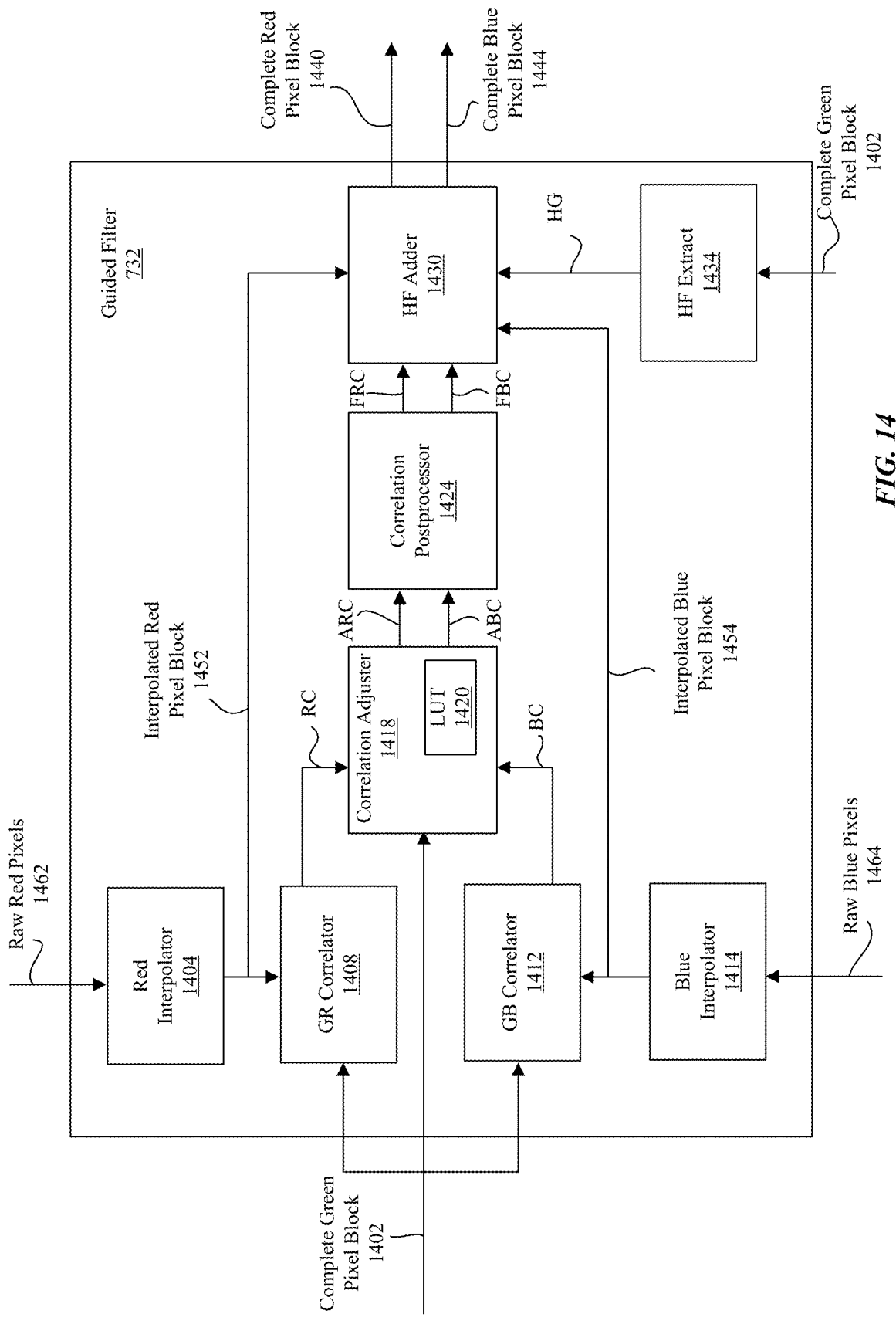
FIG. 14 is a block diagram of a guided filter, in accordance with some embodiments.

FIG. 14 illustrates a block diagram of the guided filter 732, according to some embodiments. The guided filter 732 receives raw red pixels 1462 and raw blue pixels 1464 from the raw image, and reconstructs full resolution red pixel block 1440 and full resolution blue pixel block using the full resolution green pixel block 1402. For this purpose, the guided filter 732 may include, among other components, a red interpolator circuit 1404, a blue interpolator circuit 1414, a green red (GR) correlator circuit 1408, a green blue (GB) correlator circuit 1412, a correlation adjuster circuit 1418, a correlation postprocessor 1424, a high frequency (HF) adder circuit 1430, and a HF extract circuit 1434. The guided filter 732 may include fewer or more components than what are shown in FIG. 14. For example, the red interpolator circuit 1404 and the blue interpolator circuit 1414 may be combined into a single circuit.

The red interpolator circuit 1404 receives the raw red pixels 1462 and performs interpolation on raw red pixels 1462 to fill in missing red pixel values and generate interpolated red pixel block 1452. In one or more embodiments, the red interpolator circuit 1404 may perform low-pass filtering on the raw red pixels 1462 to generate the interpolated red pixel values. As a result, the red interpolator circuit 1404 generates interpolated red pixel block 1452 that includes the interpolated red pixel values in place of blue/green pixels in the raw image. The blue interpolator circuit 1414 operates in the same way as the red interpolator circuit 1404 except that blue interpolator circuit 1414 performs interpolation on raw blue pixels 1464 to generate interpolated blue pixel block 1454, replacing red/green pixels in the raw image with interpolated blue pixels.

The red interpolator circuit 1404 determines covariance values for pixels in the complete green pixel block 1402 and the interpolated red pixel block 1452 as values representing the correlation between the complete green pixel block 1402 and the interpolated red pixel block 1452 by applying the green pixel values of full resolution green pixel block 1402 and red pixel values of the interpolated red pixel block 1452 to a covariance function. As a result, pixel-by-pixel covariance values RC are obtained by the correlator circuit 1408. The GB correlator circuit 1412 performs the same operation on the pixels of the full resolution green pixel block 1402 and the pixels of the interpolated blue pixel block 1454. As a result, the GB correlator circuit 1412 generates pixel-by-pixel GB covariance values BC that represent the correlation between the interpolated red pixel block 1452 and the full resolution green pixel block 1402.

The correlation adjuster circuit 1418 receives the covariance values RC, BC and the full resolution green pixel block 1402. From the full resolution green pixel block 1402, the correlation adjuster circuit 1418 extracts brightness of the green pixels. Then, the correlation adjuster circuit 1418 adjusts the covariance values RC as a function of the covariance values BC and the brightness of the green pixels to generate adjusted GR covariance values ARC. Similarly, the correlation adjuster circuit 1418 adjusts the covariance values BC as a function of the correlations values RC and the brightness of the green pixel values to generate adjusted GB covariance values ABC. That is, the correlation adjuster circuit 1418 adjusts covariance values RC, BC of a color channel (e.g., red or blue) based on the covariance values BC, RC of the other color channel (e.g., blue or red) and the brightness of the green channel.

In one or more embodiments, the correlation adjuster circuit 1418 includes a look-up table (LUT) 1420 with entries for adjusting the covariance values RC, BC into adjusted covariance values ARC, ABC as a function of the other covariance values BC, RC and the brightness of the corresponding green pixels. The entries in the LUT 1420 may be programmed and set by a software or a user.

The correlation postprocessor 1424 receives the adjusted covariance values ARC, ABC and performs postprocessing on these values to generate the final covariance values FRC, FBC. For example, the adjusted covariance values ARC, ABC may be low-pass filtered, scaled, applied with a predetermined curve function, and/or fitted within top/bottom thresholds. In one or more embodiments, one or more of the final covariance values FRC, FBC are set to zero or a predetermined low value if the corresponding adjusted covariance values ARC, ABC are below a threshold.

The HF extract circuit 1434 is a circuit that extracts high-frequency components HG of the full resolution green pixel block 1402 and provides them to the adder circuit 1430. In one or more embodiments, the HF extract circuit 1434 performs high-pass filtering on the full resolution green pixel block 1402 to generate the high-frequency components HG.

The HF adder circuit 1430 adds high-frequency components HG derived from the full resolution green pixel block 1402 to the interpolated red pixel block 1452 and interpolated blue pixel block 1454 using the final covariance values FRC, FBC as weights or factors. If final covariance values FRC are higher, then the patterns in the red pixels are likely to align closely with those of the full resolution green pixels. Accordingly, the adder circuit 1430 increases the degree to which the high-frequency components HG are added into the interpolated red pixel block 1452. Conversely, if the final covariance values are low, then the patterns in the red pixels are unlikely to align closely with those of the full resolution green pixels. Hence, the high-frequency components HG are not added or added only slightly to the interpolated red pixel block 1452. The same process is applied to the interpolated blue pixel block 1454. As a result of adding the high-frequency components to the interpolated red pixel block 1452 and the interpolated blue pixel block 1454, respectively, the HF adder circuit 1430 generates the full resolution red pixel block 1440 and the full resolution blue pixel block 1444.

The full resolution green pixel block 1402, the full resolution red pixel block 1440, and the full resolution blue pixel block 1444 may be combined by the guided filter 732 or a subsequent circuit to generate a full-color (e.g., RGB) image.

The final covariance values FRC, FBC may differ pixel-by-pixel so that different red/blue pixels are adjusted individually. Hence, the full resolution red pixel block 1440 and the full resolution blue pixel block 1444 may be produced without repeating the complex interpolation process performed on the green pixels.

The structure of the guided filter 732 and its components as illustrated in FIG. 14 are merely illustrative. For example, the correlation postprocessor 1424 may be omitted. Further, only one of the raw red pixels 1462 or the raw blue pixels 1464 may be added with the high-frequency components while the other is left unmodified.

Example Process Flows

Figure 15:
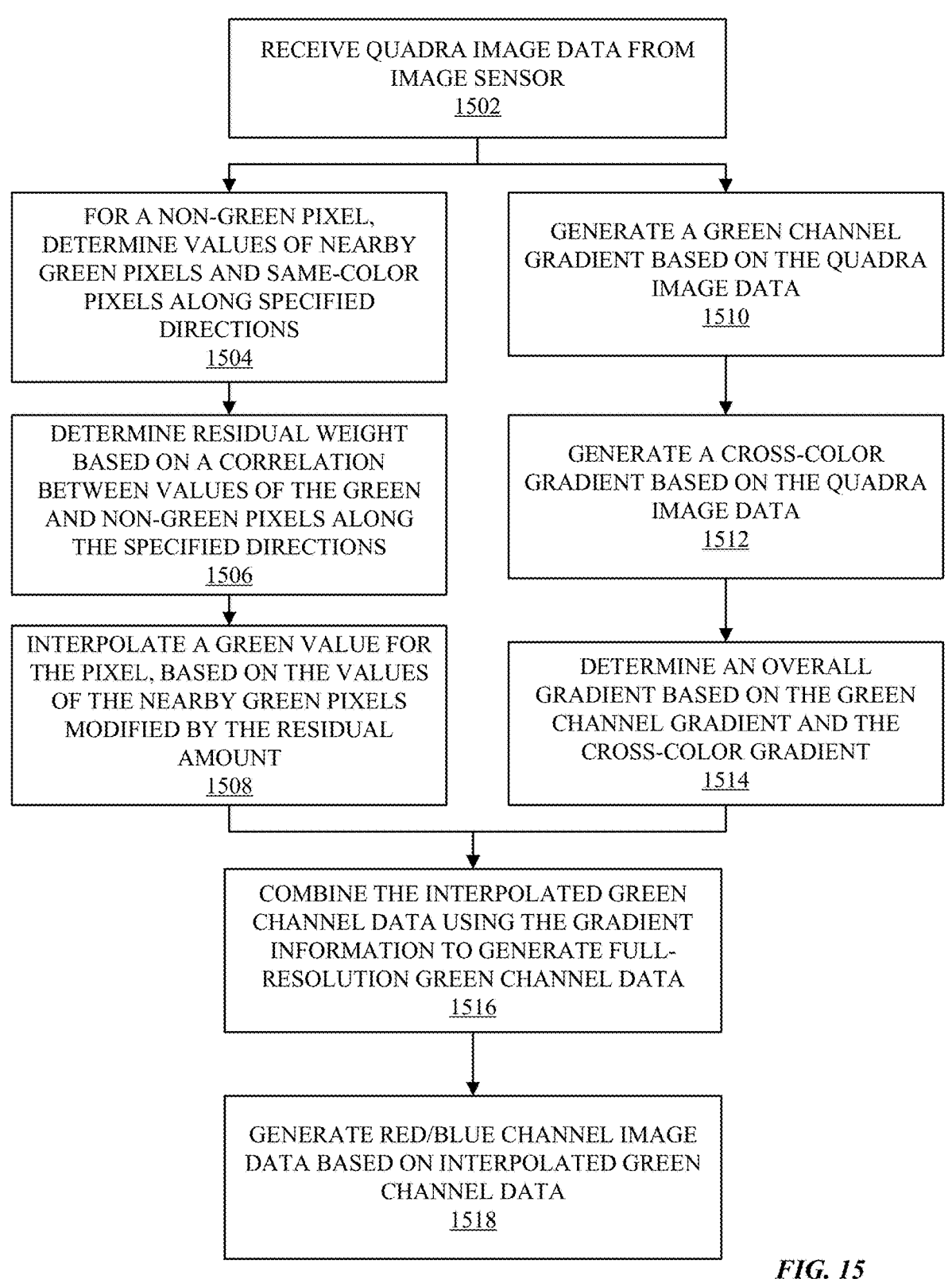
FIG. 15 is a flowchart of a process for multi-mode demosaicing and scaling of image data, in accordance with some embodiments.

FIG. 15 is a flowchart of a process for demosaicing Quadra image data, in accordance with some embodiments. The process of FIG. 15 may be performed by a demosaicing circuit, such as the Quadra demosaicing circuit 612 illustrated in FIG. 6.

The demosaicing circuit receives 1502 Quadra image data from one or more image sensors. The demosaicing circuit demosaics the received image data may performing linear interpolation of the image data along a plurality of directions to generate a plurality of interpolated green channels corresponding to the plurality of directions. In addition, the demosaicing circuit may, in parallel, identify gradient values of the received image data along the plurality of directions, for use in combining the interpolated image data associated with the different directions.

To interpolate the image data, the demosaicing circuit determines 1504, for a non-green pixel of the image data, values of nearby green pixels and same-color pixels along each of a plurality of specified directions. The values of the nearby green pixels are aggregated to generate a base green value, while the values of the same-color pixels are aggregated to generate a residual value. The demosaicing circuit determines 1506 a residual weight based on a correlation between values of the green and non-green pixels along each direction. In some embodiments, the residual weight may indicate a percentage of the residual to be added to the base green value, where no residual is added if there is no correlation between the values of the green and same-color pixels, and the full amount of the residual is added if the values of the green and same-color pixels completely correlate. The demosaicing circuit interpolates 1508 a final green value for the pixel, based on the values of the nearby green pixels (e.g., the base green value) modified by the residual amount based on the residual weight.

In parallel to the interpolation, the demosaicing circuit determines gradient information for the image data. The demosaicing circuit generates 1510 a green channel gradient based on the Quadra image data along each of a plurality of directions. In some embodiments, the green channel gradient is generated using a second-order low pass filter. In addition, the demosaicing circuit generates 1512 a cross-color gradient based on the Quadra image data. In some embodiments, cross-color gradient is based upon a sum of absolute values of the differences between pairs of adjacent pixels of different colors (e.g., a green pixel and a non-green pixel).

The demosaicing circuit determines 1514 an overall gradient based on the green channel gradient and the cross-color gradient. In some embodiments, the demosaicing circuit normalizes the determined cross-color gradient using a cross-color gradient determined along a different direction (e.g., vertical with horizontal, diagonal with opposite diagonal), and modifies the green channel gradient using the normalized cross-color gradient to obtain the final overall gradient values. In some embodiments, the demosaicing circuit further generates a same-color first-order gradient based upon a sum of absolute values of differences between adjacent same-color pixels, which is used to modify the normalized cross-color gradient value.

The demosaicing circuit combines 1516 the interpolated green channel data based on the gradient information to generate full-resolution green channel data. For example, in some embodiments, the demosaicing circuit generates a weighted average of the green channel data interpolated along different directions, using the determined gradient information as weights.

The demosaicing circuit generates 1518 full-resolution red and blue channel data using the full-resolution green channel data, as described below in detail with reference to FIG. 16. In some embodiments, the demosaicing circuit generates the red and blue image data by performing a low pass on red or blue channels modified by a high frequency of the full-resolution green channel data, where the amount of high frequency that is added from green to the red and blue values is based upon covariances between the green/red image data and green/blue image data as well as the luminance of the green image data.

The generated full-resolution red and blue image data is combined with the full-resolution green image data to form the full-color demosaiced RGB image data.

FIG. 16 is a flowchart of a process at the guided filter 732, in accordance with some embodiments. The guided filter 732 generates 1602 an interpolated version of red pixel data and an interpolated version of blue pixel data from the raw image data. Alternatively, the interpolated version of the red pixel data and the interpolated version of the blue pixel data may be generated outside the guide filter 732 and provided to the guided filter 732.

The guided filter 732 determines 1606 covariance values as the pixel-by-pixel correlation values between the red pixels and the green pixels at corresponding locations. The guided filter 732 determines 1610 covariance values as the pixel-by-pixel correlation values between the blue pixel and the green pixels at corresponding locations. The correlation values may be covariance values.

The weights for adding the high-frequency components of the full-resolution green pixels to the red pixels are determined 1614 based on at least the correlation values (e.g., the covariance values) derived from the red pixels and the blue pixels. The weights for the blue pixels are determined 1618 based on at least the covariance values derived from the blue pixels and the red pixels.

Full-resolution green image data is high-pass filtered to extract high-frequency components of the green image data. The high-frequency components are applied 1622 to the interpolated version of the red pixels by adding the high-frequency components to the interpolated version of the red pixels according to the weights for the red pixels. Similarly, the high-frequency components are applied 1626 to the interpolated version of the blue pixels by adding the high-frequency components to the interpolated version of the blue pixels according to the weights for the blue pixels.

The steps and their sequences as illustrated in FIG. 16 are merely illustrative. Additional processes such as low-pass filtering may be performed on the red pixels and blue pixels applied with the high-frequency components. Further, the processes of determining 1606 the red correlation values and determining 1610 the blue correlation values may be reversed in terms of sequence or may be performed in parallel.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An apparatus for demosaicing a raw image, comprising:
an interpolation circuit to interpolate raw image data along a plurality of directions to generate a respective plurality of interpolated green pixel data;
a weighted averaging circuit to combine the respective plurality of interpolated green pixel data to generate full-resolution green image data; and
a guided filter circuit to:
generate an interpolated version of red pixel data and an interpolated version of blue pixel data from the raw image data,
determine red correlation values between red pixels in the interpolated version of the red pixel data and first green pixels at corresponding first locations in the full-resolution green image data, the red correlation values represented by pixel-by-pixel covariance values between the red pixels in the interpolated version of the red pixel data and the first green pixels,
determine blue correlation values between blue pixels in the interpolated version of the blue pixel data and second green pixels at corresponding second locations in the full-resolution green image data,
determine weight values for the red pixels according to the red correlation values and the blue correlation values, and
apply pixel values of a high-pass filtered version of the full-resolution green image data to the interpolated version of the red pixel data according to the determined weight values for the red pixels to generate full-resolution red image data.

2. The apparatus of claim 1, wherein the raw image data is in a Quadra Bayer image format.

3. The apparatus of claim 1, wherein the guided filter circuit is to further determine the weight values for the red pixels further according to brightness of the second green pixels.

4. The apparatus of claim 3, wherein the guided filter circuit comprises a lookup table storing adjustment values corresponding to the blue correlation values and the brightness of the second green pixels, wherein the adjustment values are read from the lookup table and applied to the red correlation values to obtain adjusted versions of the red correlation values, and wherein the weight values are obtained by processing the adjusted versions of the red correlation values.

5. The apparatus of claim 4, wherein the adjusted versions of red correlation values are low-pass filtered to obtain the weight values.

6. The apparatus of claim 1, wherein the plurality of interpolated green pixel data comprises, for a non-green pixel of the raw image data, a horizontally interpolated green pixel data, a vertically interpolated green pixel data, and two diagonally interpolated green pixel data.

7. The apparatus of claim 6, wherein each of the two diagonally interpolated green pixel data are determined by interpolating green pixels in the raw image data placed along three different diagonal lines slanted with different angles.

8. The apparatus of claim 7, wherein the guided filter circuit is further:
determine weight values for blue pixels according to the blue correlation values and the red correlation values, and
apply pixel values of the high-pass filtered version of the full-resolution green image data to the interpolated version of the blue pixel data according to the determined weight values for the blue pixels to generate full-resolution blue image data.

9. The apparatus of claim 1, wherein the red correlation values and the blue correlation values are determined per each pixel of the full resolution green image data.

10. A method of demoisaicing raw image data, comprising:
interpolating the raw image data along a plurality of directions to generate a respective plurality of interpolated green pixel data;
combining the respective plurality of interpolated green pixel data to generate full-resolution green image data;
generating an interpolated version of red pixel data and an interpolated version of blue pixel data from the raw image data,
determining red correlation values between red pixels in the interpolated version of the red pixel data and first green pixels at corresponding first locations in the full-resolution green image data, the red correlation values represented by pixel-by-pixel covariance values between the red pixels in the interpolated version of the red pixel data and the first green pixels,
determining blue correlation values between blue pixels in the interpolated version of the blue pixel data and second green pixels at corresponding second locations in the full-resolution green image data,
determining weight values for the red pixels according to the red correlation values and the blue correlation values, and
applying pixel values of a high-pass filtered version of the full-resolution green image data to the interpolated version of the red pixel data according to the determined weight values for the red pixels to generate full-resolution red image data.

11. The method of claim 10, wherein the raw image data is in a Quadra Bayer image format.

12. The method of claim 10, further comprising determining the weight values for the red pixels further according to brightness of the second green pixels.

13. The method of claim 12, further comprising:
storing adjustment values corresponding to the blue correlation values and the brightness of the second green pixels in a lookup table;
reading the adjustment values from the lookup table;
applying the read adjustment values to the red correlation values to obtain adjusted versions of the red correlation values; and
obtaining the weight values for the red pixels by processing the adjusted versions of the red correlation values.

14. The method of claim 13, wherein the adjusted versions of red correlation values are low-pass filtered to obtain the weight values for the red pixels.

15. The method of claim 10, wherein the plurality of interpolated green pixel data comprises, for a non-green pixel of the raw image data, a horizontally interpolated green pixel data, a vertically interpolated green pixel data, and two diagonally interpolated green data.

16. The method of claim 15, further comprising generating each of the two diagonally interpolated green pixel data is generated interpolating green pixels in the raw image data placed along three different diagonal lines slanted with different angles.

17. The method of claim 16, further comprising:
determining weight values for blue pixels according to the blue correlation values and the red correlation values, and applying pixel values of the high-pass filtered version of the full-resolution green image data to the interpolated version of the blue pixel data according to the determined weight values for the blue pixels to generate full-resolution blue image data.

18. The method of claim 10, wherein the red correlation values and the blue correlation values are determined per each pixel of the full resolution green image data.

19. An electronic device, comprising:

an image sensor; and an image signal processor coupled to the image sensor and configured to receive raw image data from the image sensor, comprising:

an interpolation circuit to interpolate the raw image data along a plurality of directions to generate a respective plurality of interpolated green pixel data;

a weighted averaging circuit to combine the respective plurality of interpolated green pixel data to generate full-resolution green image data; and a guided filter circuit to:

generate an interpolated version of red pixel data and an interpolated version of blue pixel data from the raw image data, determine red correlation values between red pixels in the interpolated version of the red pixel data and first green pixels at corresponding first locations in the full-resolution green image data, the red correlation values represented by pixel-by-pixel covariance values between the red pixels in the interpolated version of the red pixel data and the first green pixels values, determine blue correlation values between blue pixels in the interpolated version of the blue pixel data and second green pixels at corresponding second locations in the full-resolution green image data, determine weight values for the red pixels according to the red correlation values and the blue correlation values, and apply pixel values of a high-pass filtered version of the full-resolution green image data to the interpolated version of the red pixel data according to the determined weight values for the red pixels to generate full-resolution red image data.

20. The electronic device of claim 19, wherein the raw image data is in a Quadra Bayer image format.

* * * * *